US012688824B2

(12) United States Patent
Hwang

(10) Patent No.: US 12,688,824 B2
(45) Date of Patent: Jul. 21, 2026

(54) IMAGE DISPLAY APPARATUS CAPABLE OF IMPROVING LUMINANCE OF DISPLAY WHILE SATISFYING REGULATION ON POWER CONSUMPTION

(71) Applicant: LG ELECTRONICS INC., Seoul (KR)

(72) Inventor: Chasung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/003,441

(22) Filed: Dec. 27, 2024

(65) Prior Publication Data

US 2026/0120629 A1 Apr. 30, 2026

(30) Foreign Application Priority Data

May 21, 2024 (KR) ........................ 10-2024-0065592

(51) Int. Cl.
*G09G 3/3208* (2016.01)

(52) U.S. Cl.
CPC ....... *G09G 3/3208* (2013.01); *G09G 2310/08* (2013.01); *G09G 2320/0233* (2013.01); *G09G 2330/023* (2013.01); *G09G 2360/16* (2013.01)

(58) Field of Classification Search
None
See application file for complete search history.

(56) References Cited

U.S. PATENT DOCUMENTS

2013/0076803 A1 3/2013 Lee et al.
2014/0176620 A1 6/2014 Yano et al.
2015/0097872 A1 4/2015 Jeong et al.
2020/0035155 A1* 1/2020 Han .................... G09G 3/2092
2021/0319751 A1* 10/2021 Lee ...................... G06F 3/0482
2022/0208044 A1 6/2022 Lee
2023/0125418 A1* 4/2023 Zen ..................... G09G 3/3208
2024/0153445 A1 5/2024 Pyun et al.
2025/0308428 A1* 10/2025 An ...................... G09G 3/2007

FOREIGN PATENT DOCUMENTS

JP 2006-91681 A 4/2006
JP 2007-514966 A 6/2007
JP 2023-66380 A 5/2023
KR 10-2010-0069114 A 6/2010

* cited by examiner

*Primary Examiner* — Donna V Bocar
(74) *Attorney, Agent, or Firm* — Birch, Stewart, Kolasch & Birch, LLP

(57) ABSTRACT

The image display apparatus according to an embodiment of the present disclosure comprises: an organic light emitting panel; a signal processing device to perform signal processing on an input image and output an image signal; a timing controller to drive the organic light emitting panel based on the image signal; and a power supply to supply a display driving voltage, wherein the signal processing device is configured to calculate a luminance level based on the average picture level of the input image, calculate output luminance level based on the luminance level and an offset level corresponding to current information detected in response to the display driving voltage in the timing controller, and output an image signal corresponding to the output luminance level. Accordingly, it is possible to improve the luminance of the display while satisfying regulation on power consumption.

15 Claims, 20 Drawing Sheets

IMAGE DISPLAY APPARATUS CAPABLE OF IMPROVING LUMINANCE OF DISPLAY WHILE SATISFYING REGULATION ON POWER CONSUMPTION

CROSS-REFERENCE TO RELATED APPLICATION

This application claims priority to Korean Patent Application No. 10-2024-0065592, filed in the Republic of Korea on May 21, 2024, which is hereby incorporated by reference as if fully set forth herein.

BACKGROUND

1. Field

The present disclosure relates to an image display apparatus, and more particularly, to an image display apparatus capable of improving the luminance of a display while satisfying regulation on power consumption.

2. Description of the Related Art

An image display apparatus is an apparatus that displays images.

Recently, in keeping with the increase in image resolution and the increase in image sharpness, the display resolution or peak luminance of a display in an image display apparatus is increasing.

Incidentally, as the display resolution or peak luminance of a display increases, the consumption of power supplied to the display increases.

In this regard, research is being conducted on how to reduce power consumption in image display apparatuses, especially, on how to reduce power consumption to cope with power consumption regulations in different countries.

Meanwhile, in the case of a display with an organic light emitting panel, power consumption deviations occur even when the same image is displayed, due to panel deviations of the organic light emitting panel.

If signal processing for reducing power consumption is performed indiscriminately without considering such panel deviations, the luminance of the display may be lost.

SUMMARY

An object of the present disclosure is to provide an image display apparatus capable of improving the luminance of a display while satisfying regulation on power consumption.

Another object of the present disclosure is to provide an image display apparatus capable of improving the luminance of a display based on efficient calculation while satisfying regulation on power consumption.

Yet another object of the present disclosure is to provide an image display apparatus capable of improving the luminance of a display in consideration of panel deviations while satisfying regulation on power consumption.

One embodiment of the present disclosure provides an image display apparatus including: an image display apparatus including: an organic light emitting panel; a signal processing device configured to perform signal processing on an input image and output an image signal; a timing controller configured to drive the organic light emitting panel based on the image signal from the signal processing device; and a power supply configured to supply a display driving voltage to the timing controller, wherein the signal processing device is configured to calculate a luminance level based on the average picture level of the input image, calculate output luminance level based on the luminance level and an offset level corresponding to current information detected in response to the display driving voltage in the timing controller, and output an image signal corresponding to the output luminance level.

Meanwhile, the signal processing device may be configured to, in the case in which the detected current information is lower than a reference level, increase the offset level as a difference between the detected current information and the reference level increases.

Meanwhile, in the case in which the detected current information is equal to or higher than the reference level, the signal processing device may be configured to output an image signal corresponding to the calculated luminance level based on the average picture level of the input image, without the offset level.

Meanwhile, in the case in which the average picture level of the input image is a first level and the level of the detected current information is a second level lower than a reference level, the signal processing device may be configured to output an image signal based on the first level and a first offset level corresponding to the second level.

Meanwhile, in the case in which the average picture level of the input image is the first level and the level of the detected current information is a third level lower than the reference level and higher than the second level, the signal processing device may be configured to output an image signal based on the first level and a second offset level corresponding to the third level.

Meanwhile, the signal processing device may be configured to the second offset level is lower than the first offset level.

Meanwhile, in the case in which the average picture level of the input image is a first level and the level of the detected current information is a fourth level equal to or higher than the reference level, the signal processing device may be configured to output an image signal corresponding to the first level.

Meanwhile, the signal processing device may be configured to decrease the luminance level of the image signal outputted from the signal processing device as the average picture level increases.

Meanwhile, in the case in which the average picture level of the input image is a first level and the level of the detected current information is a second level lower than a reference level, the signal processing device may be configured to output an image signal based on the first level and a first offset level corresponding to the second level, and in the case in which the average picture level of the input image is a third level higher than the first level and the level of the detected current information is the second level lower than the reference level, the signal processing device may be configured to output an image signal based on the third level and a second offset level lower than the first offset level.

Meanwhile, the signal processing device may be configured to decrease the offset level as the level of the display driving voltage increases.

Meanwhile, the signal processing device may be configured to decrease the offset level as cumulative operating period of the display increases.

Meanwhile, the signal processing device may comprise: an average picture level calculator configured to calculate the average picture level of the input image; an offset level calculator configured to calculate the offset level based on the detected current information from the timing controller;

and a data output part configured to output an image signal corresponding to the output luminance level calculated based on the average picture level and the offset level.

Another embodiment of the present disclosure provides an image display apparatus including: an organic light emitting panel; a signal processing device configured to perform signal processing on an input image and output an image signal; a timing controller configured to drive the organic light emitting panel based on the image signal from the signal processing device; and a power supply configured to supply a display driving voltage to the timing controller, wherein the timing controller is configured to output the display driving voltage or a first current corresponding to the display driving voltage, detect the first current, and transmit detected current information of the first current to the signal processing device, and the signal processing device is configured to calculate a luminance level based on the average picture level of the input image, calculate output luminance level based on the luminance level and an offset level corresponding to the detected current information, and output an image signal corresponding to the output luminance level.

Yet another embodiment of the present disclosure provides an image display apparatus including: an organic light emitting panel; a signal processing device configured to perform signal processing on an input image and output an image signal; a timing controller configured to drive the organic light emitting panel based on the image signal from the signal processing device; and a power supply configured to supply a display driving voltage to the timing controller, wherein the timing controller is configured to calculate a luminance level based on the average picture level of the input image, calculate output luminance level based on the luminance level and an offset level corresponding to current information detected in response to the display driving voltage in the timing controller, and output an image signal corresponding to the output luminance level.

Meanwhile, in the case in which the average picture level of the input image is a first level and the level of the detected current information is a second level lower than a reference level, the signal processing device may be configured to output an image data signal based on the first level and a first offset level corresponding to the second level.

Meanwhile, in the case in which the average picture level of the input image is the first level and the level of the detected current information is a third level lower than the reference level and higher than the second level, the signal processing device may be configured to output an image data signal based on the first level and a second offset level corresponding to the third level.

Meanwhile, the timing controller may comprise: a current detector configured to detect an output current corresponding to the display driving voltage; an offset level calculator configured to calculate the offset level based on detected current information from the current detector; and a data output part configured to output an image data signal corresponding to the output luminance level calculated based on the average picture level and the offset level.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Hereinafter, the present disclosure will be described in detail with reference to the accompanying drawings.

Regarding constituent elements used in the following description, suffixes “module” and “unit” are given only in consideration of ease in the preparation of the specification, and do not have or serve as different meanings. Accordingly, the suffixes “module” and “unit” may be used interchangeably.

Figure 1:
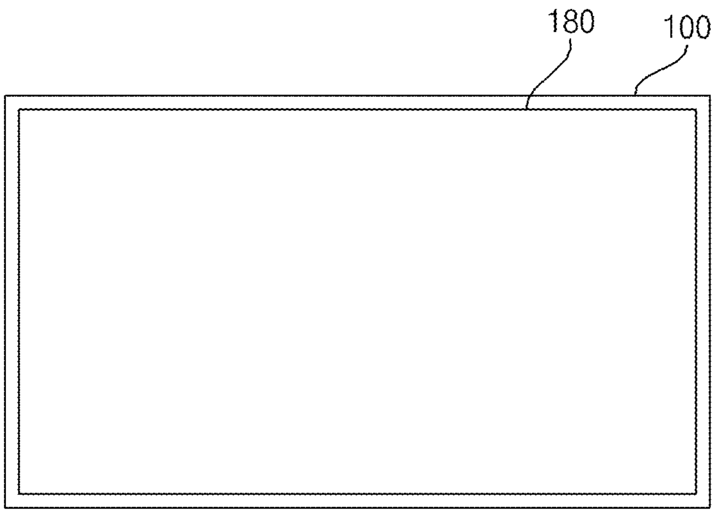
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may comprise a display 180.

The display resolution of the display 180 is getting higher and higher, and the peak luminance that can be shown on the display 180 is also increasing. Accordingly, the consumption of power supplied to the display 180 increases.

Incidentally, in the case in which the display 180 has an organic light emitting panel (OLED panel) which is a self-emitting display panel, the luminance level of image signals is varied based on the average luminance of an input image, in order to reduce power consumption.

Meanwhile, since the organic light emitting panel has panel deviations, unnecessary luminance loss may occur when power consumption is reduced based on the average luminance of the input image.

To this end, the present disclosure proposes a method for improving the luminance of a display while satisfying regulation on power consumption.

An image display apparatus 180 according to an embodiment of the present disclosure calculates a luminance level based on the average picture level of an input image, calculates output luminance level based on the luminance level and an offset level corresponding to detected current information Idt detected in response to a display driving voltage EVDD.

Accordingly, it is possible to improve the luminance of the display 180 while satisfying regulation on power consumption. Also, it is possible to improve the luminance of the display 180 based on efficient calculation while satisfying regulation on power consumption. Furthermore, it is possible to improve the luminance of the display 180 in consideration of panel deviations while satisfying regulation on power consumption.

Meanwhile, the image display apparatus 100 of FIG. 1 may be a TV, a monitor, a vehicle display, a tablet PC, a mobile terminal, or the like.

Figure 2:
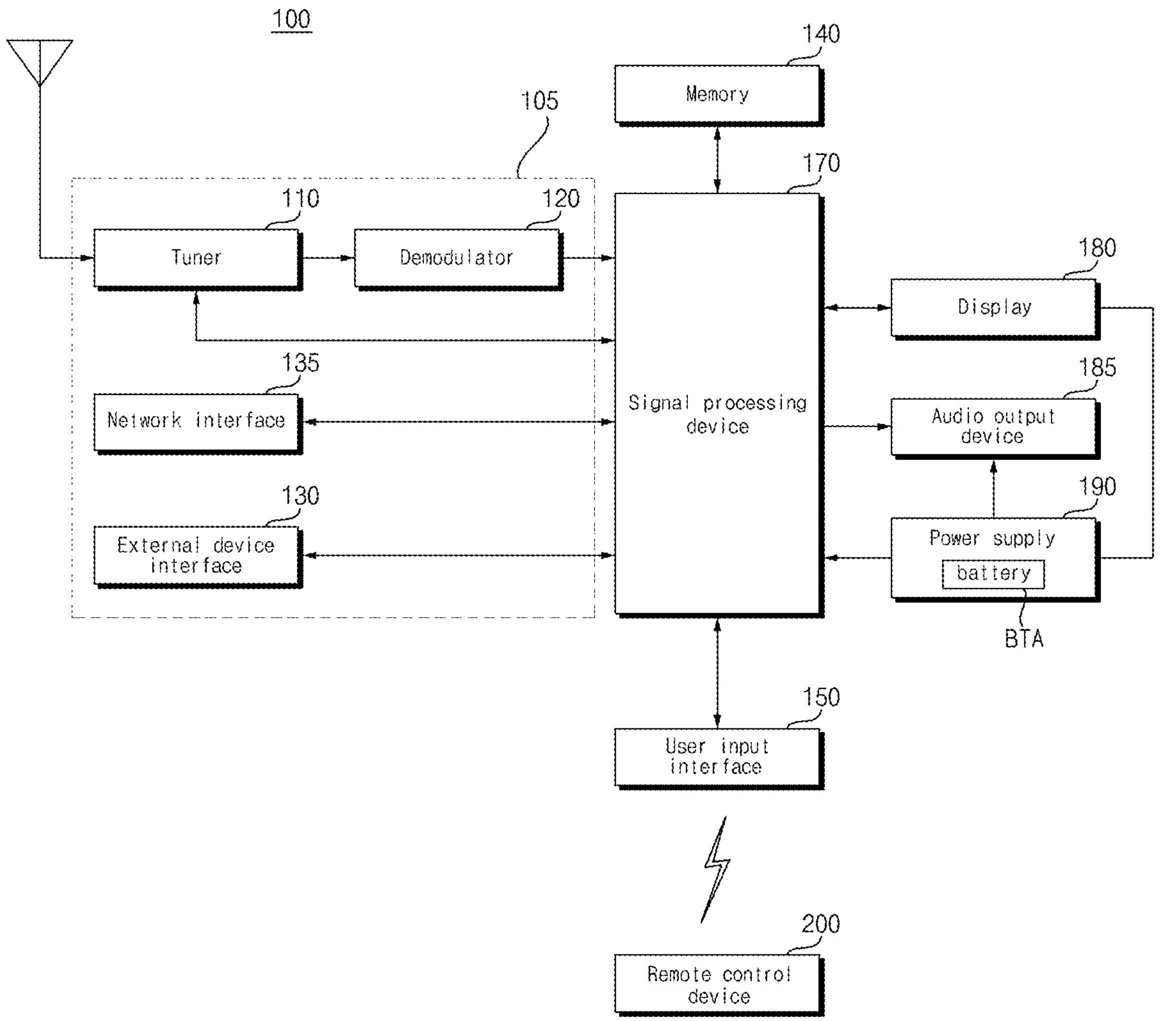
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure comprises an image receiver 105, an external apparatus interface 130, a memory 140, a user input interface 150, a sensor device (not shown), a signal processing device 170, a display 180, and an audio output device 185.

The image receiver 105 may comprise a tuner 110, a demodulator 120, a network interface 135, and an external apparatus interface 130.

Meanwhile, unlike the figure, the image receiver 105 may comprise only the tuner 110, the demodulator 120, and the external apparatus interface 130. That is, the network interface 135 may not be comprised.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, in the case in which the selected RF broadcast signal is a digital broadcast signal, the tuner 110 converts the digital broadcast signal into a digital IF (DIF) signal and, in the case in which the selected RF broadcast signal is an analog broadcast signal, the tuner 110 converts the analog broadcast signal into an analog baseband image or voice (CVBS/SIF) signal. That is, the tuner 110 may process a digital broadcast signal or an analog broadcast signal. The analog baseband image or voice (CVBS/SIF) signal output from the tuner 110 may be directly input to the signal processing device 170.

Meanwhile, the tuner 110 may comprise a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and output audio to the audio output device 185.

The external apparatus interface 130 may transmit or receive data with a connected external apparatus (not shown), e.g., a set-top box 50. To this end, the external apparatus interface 130 may comprise an A/V input and output device (not shown).

The external apparatus interface 130 may be connected in wired or wirelessly to an external apparatus, such as a digital versatile disk (DVD), a Blu ray, a game equipment, a camera, a camcorder, a calculator (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may comprise a wireless transceiver (not shown).

The memory 140 may store a program for each signal processing and control in the signal processing device 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be comprised in the signal processing device 170.

The user input interface 150 transmits a signal input by the user to the signal processing device 170 or transmits a signal from the signal processing device 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external apparatus interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external output apparatus through the external apparatus interface 130.

The audio signal processed by the signal processing device 170 may be output to the audio output device 185 as an audio signal. In addition, audio signal processed by the signal processing device 170 may be input to the external output apparatus through the external apparatus interface 130.

Although not shown in FIG. 2, the signal processing device 170 may comprise a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 may control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processing device 170 and output it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100.

Particularly, the power may be supplied to a signal processing device 170 which may be implemented in the form of a system on chip (SOC), a display 180 for displaying an image, and an audio output device 185 configured to output an audio.

Specifically, the power supply 190 may comprise a converter to convert the level of input voltage.

For example, in the case in which the input voltage is an alternating current voltage, the power supply 190 may have an ac/dc converter and a dc/dc converter.

As another example, in the case in which the input voltage is a direct current voltage, the power supply 190 may have a dc/dc converter.

Meanwhile, the power supply 190 has a battery BTA.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

Figure 3:
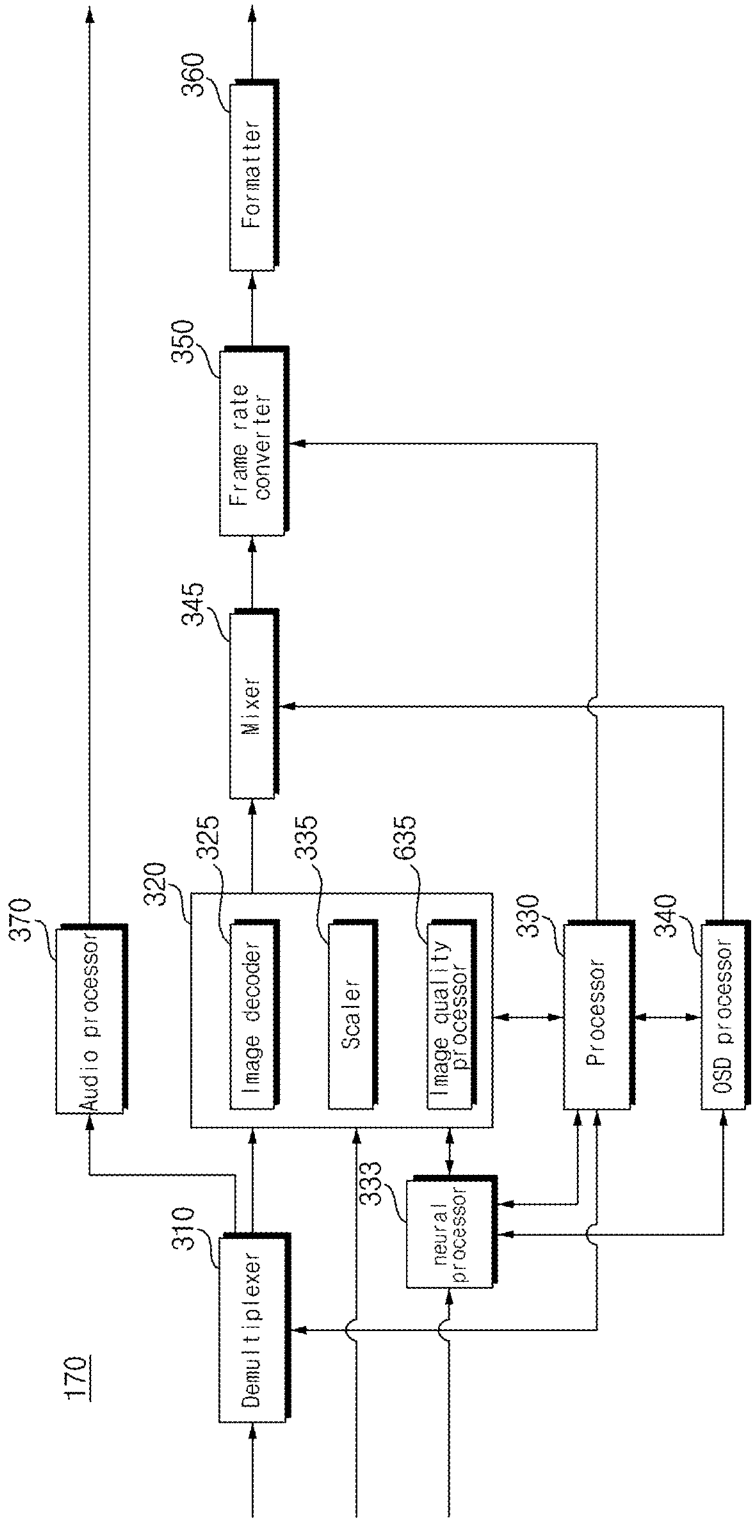
FIG. 3 is an example of an internal block diagram of a signal processing device of FIG. 2.

FIG. 3 is an example of an internal block diagram of the signal processing device in FIG. 2.

Referring to the figure, the signal processing device 170 according to an embodiment of the present disclosure may comprise a demultiplexer 310, an image processor 320, a processor 330, and an audio processor 370. In addition, the signal processing device 170 may further comprise and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may comprise an image decoder 325, a scaler 335, an image quality processor 635, an image encoder (not shown), a graphic processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may comprise a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, in the case in which the size or resolution of an input image signal is small, the scaler 335 may upscale the input image signal, and, in the case in which the size or resolution of the input image signal is large, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of gray level of the input image signal, perform image resolution enhancement, perform high dynamic range (HDR)-based signal processing, change a frame rate, and perform image quality processing suitable for properties of a panel.

The graphic processor 340 generates an OSD signal according to a user input or by itself. For example, based on a user input signal, the graphic processor 340 may generate a signal for displaying various information as a graphic or a text on the screen of the display 180. The generated OSD signal may comprise various data, such as a user interface screen of the image display apparatus 100, various menu screens, a widget, and an icon. In addition, the generated OSD signal may comprise a 2D object or a 3D object.

In addition, the graphic processor 340 may generate a pointer that may be displayed on the display, based on a pointing signal input from the remote controller 200. In particular, such a pointer may be generated by a pointing signal processing device, and the graphic processor 340 may comprise such a pointing signal processing device (not shown). Obviously, the pointing signal processing device (not shown) may be provided separately from the graphic processor 340.

The frame rate converter (FRC) 350 may convert a frame rate of an input image. Meanwhile, the frame rate converter 350 may be configured to output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

Meanwhile, the formatter 360 may change a format of an input image signal.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may comprise various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

Meanwhile, the signal processing device 170 according to an embodiment of the present disclosure may further comprise a neural processor 333 for processing learning or the like.

Figure 4A:
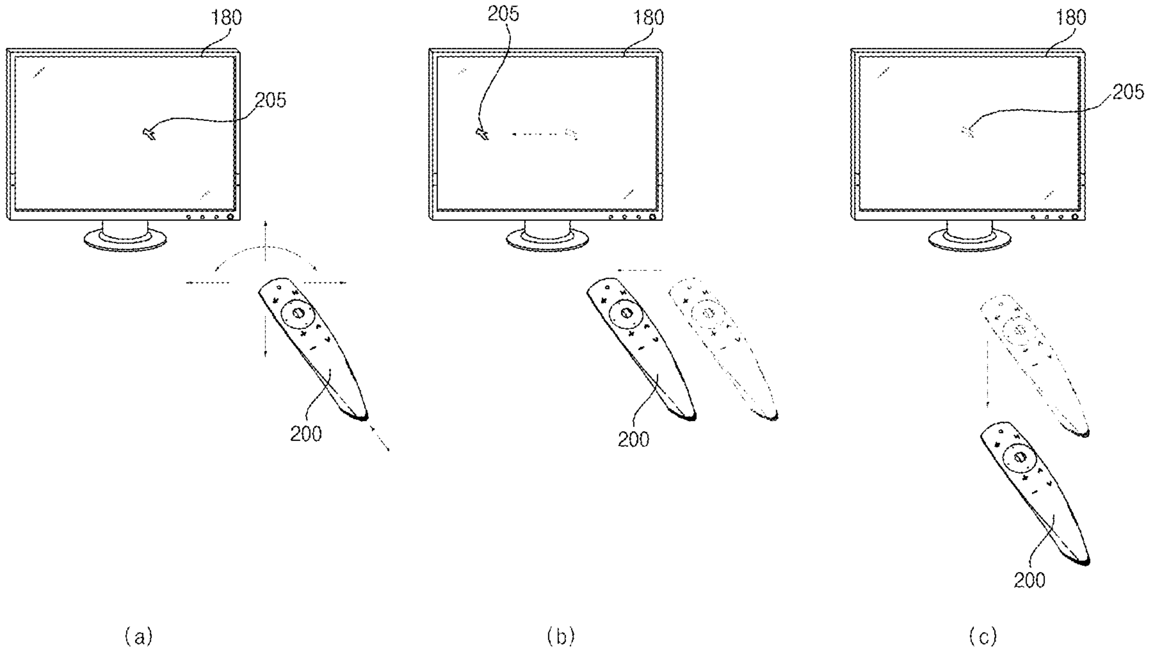
FIG. 4A is a diagram showing a method of controlling a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
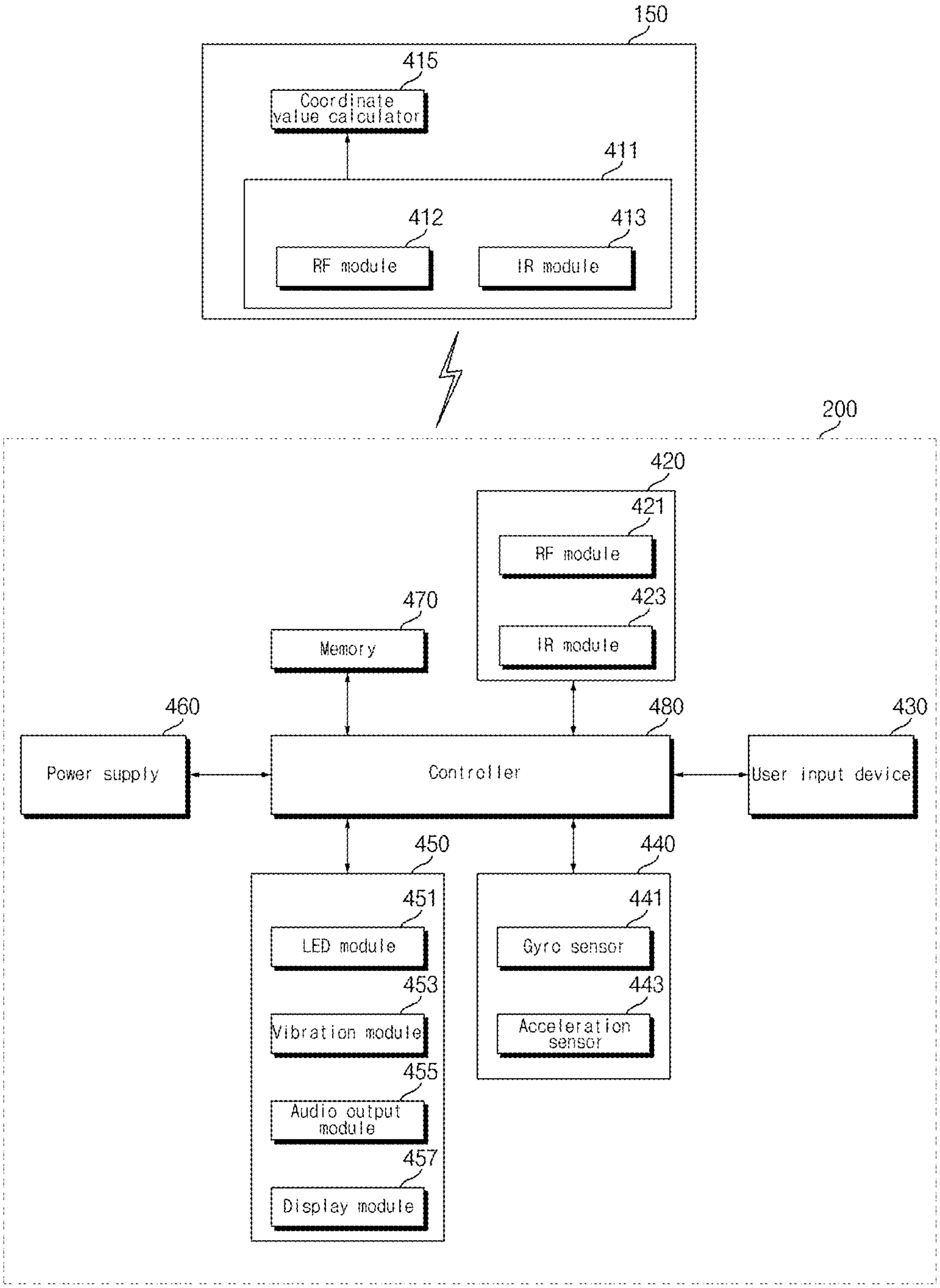
FIG. 4B is an internal block diagram of the remote controller of FIG. 2.

FIG. 4B is an internal block diagram of the remote controller of FIG. 2.

Referring to the figure, the remote controller 200 comprises a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may comprise an RF module 421 for transmitting and receiving signals to and from the image display apparatus 100 according to a RF communication standard. In addition, the remote controller 200 may comprise an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 comprises a hard key button, the user may input a command related to the image display apparatus 100 to the remote controller 200 through a push operation of the hard key button. When the user input device 435 comprises a touch screen, the user may touch a soft key of the touch screen to input the command related to the image display apparatus 100 to the remote controller 200. In addition, the user input device 435 may comprise various types of input means, such as a scroll key, a jog key, etc., which may be operated by the user, and the present disclosure does not limit the scope of the present disclosure.

The sensor device 440 may comprise a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may be configured to output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may comprise an LED module 451 that is turned on when the user input device 435 is operated or a signal is transmitted/received to/from the image display apparatus 100 through the wireless transceiver 425, a vibration module 453 for generating a vibration, an audio output module 455 configured to output an audio, or a display module 457 configured to output an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. In the case in which the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 comprises a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the figure, the coordinate value calculator 415 may be provided in the signal processing device 170, not in the user input interface 150.

Figure 5:
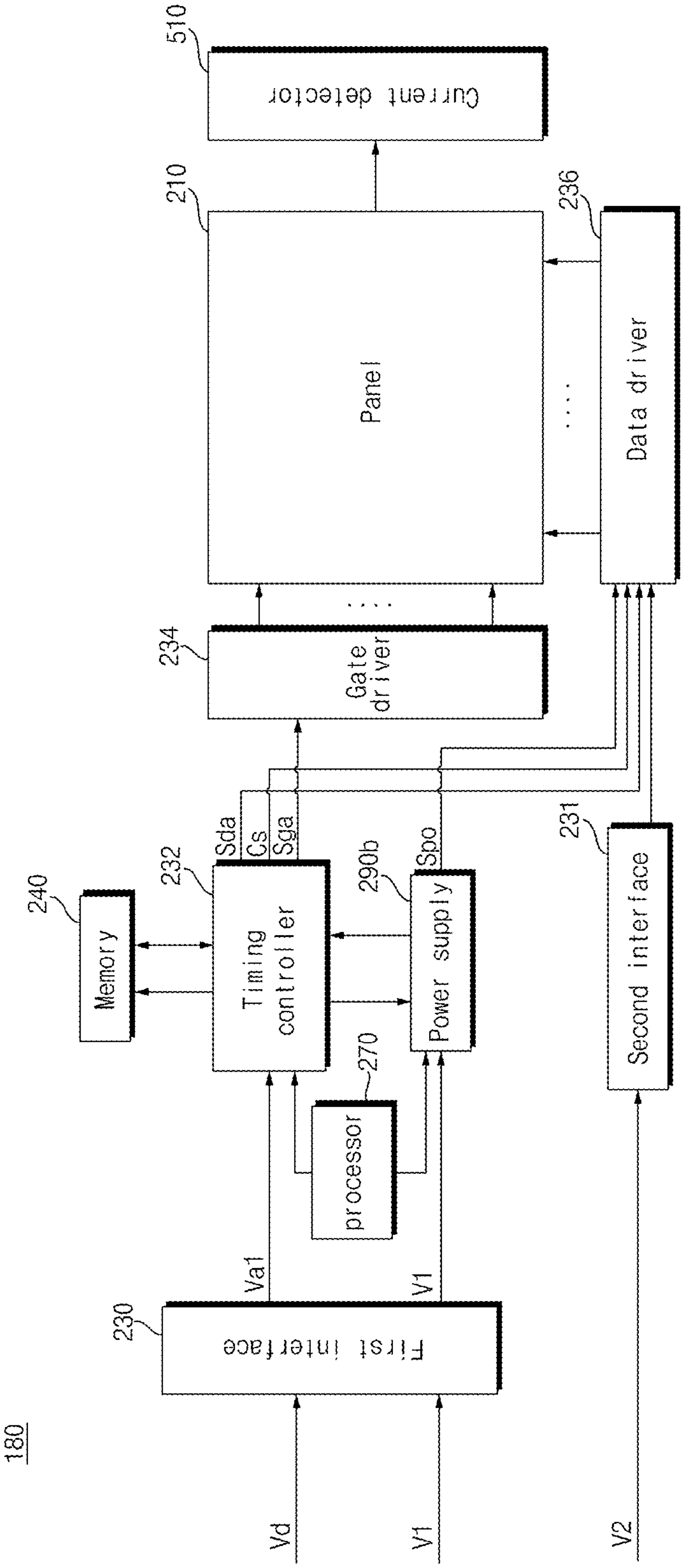
FIG. 5 is an exemplary internal block diagram of a display of FIG. 2.

FIG. 5 is an exemplary internal block diagram of a display of FIG. 2.

Referring to FIG. 5, an organic light emitting panel-based display 180 may comprise an organic light emitting panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC voltage V1, and a second DC voltage V2, and may display a certain image based on the image signal Vd.

Meanwhile, the first interface 230 in the display 180 may receive the image signal Vd and the first DC voltage V1 from the signal processing device 170.

Here, the first DC voltage V1 may be used for the operation of the power supply 290 and the timing controller 232 in the display 180.

Next, the second interface 231 may receive a second DC voltage V2 from an external power supply 190. Meanwhile, the second DC voltage V2 may be input to the data driver 236 in the display 180.

The timing controller 232 may be configured to output a data driving signal Sda and a gate driving signal Sga, based on the image signal Vd.

For example, when the first interface 230 converts the input image signal Vd and output the converted image signal val, the timing controller 232 may be configured to output the data driving signal Sda and the gate driving signal Sga based on the converted image signal val.

The timing controller 232 may further receive a control signal, a vertical synchronization signal Vsync, and the like, in addition to the image signal Vd from the signal processing device 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 comprises a RGBW subpixel, the data driving signal Sda may be a data driving signal configured to drive of RGBW subpixel.

Meanwhile, the timing controller 232 may further output a control signal Cs to the gate driver 234.

The gate driver 234 and the data driver 236 supply a scan signal and an image signal to the organic light emitting panel 210 through a gate line GL and a data line DL, respectively, according to the gate driving signal Sga and the data driving signal Sda from the timing controller 232. Accordingly, the organic light emitting panel 210 displays a certain image.

Meanwhile, the panel 210 may comprise an organic light emitting layer. In order to display an image, a plurality of gate lines GL and data lines DL may be disposed in a matrix form in each pixel corresponding to the organic light emitting layer.

Meanwhile, the data driver 236 may be configured to output a data signal to the organic light emitting panel 210 based on a second DC voltage V2 from the second interface 231.

The power supply 290 may supply various power supplies to the gate driver 234, the data driver 236, the timing controller 232, and the like.

The current detector 510 may detect the current flowing in a sub-pixel of the panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the panel 210 from the current detector 510.

Figure 6A:
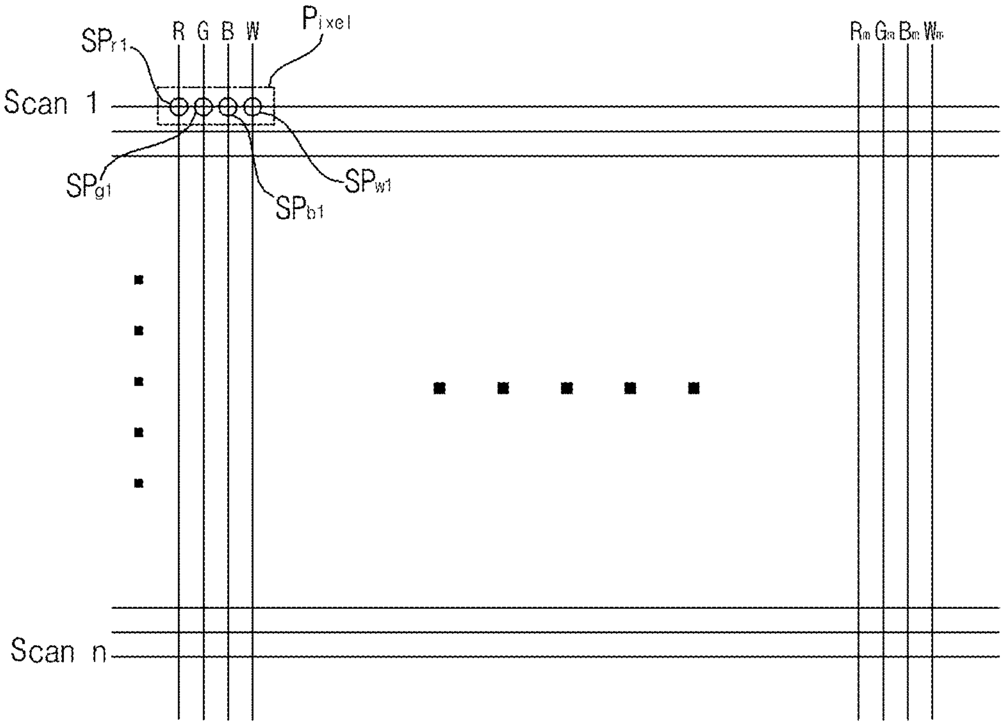
FIGS. 6A and 6B are diagrams referred to in the description of an organic light emitting panel of FIG. 5.
Figure 6B:
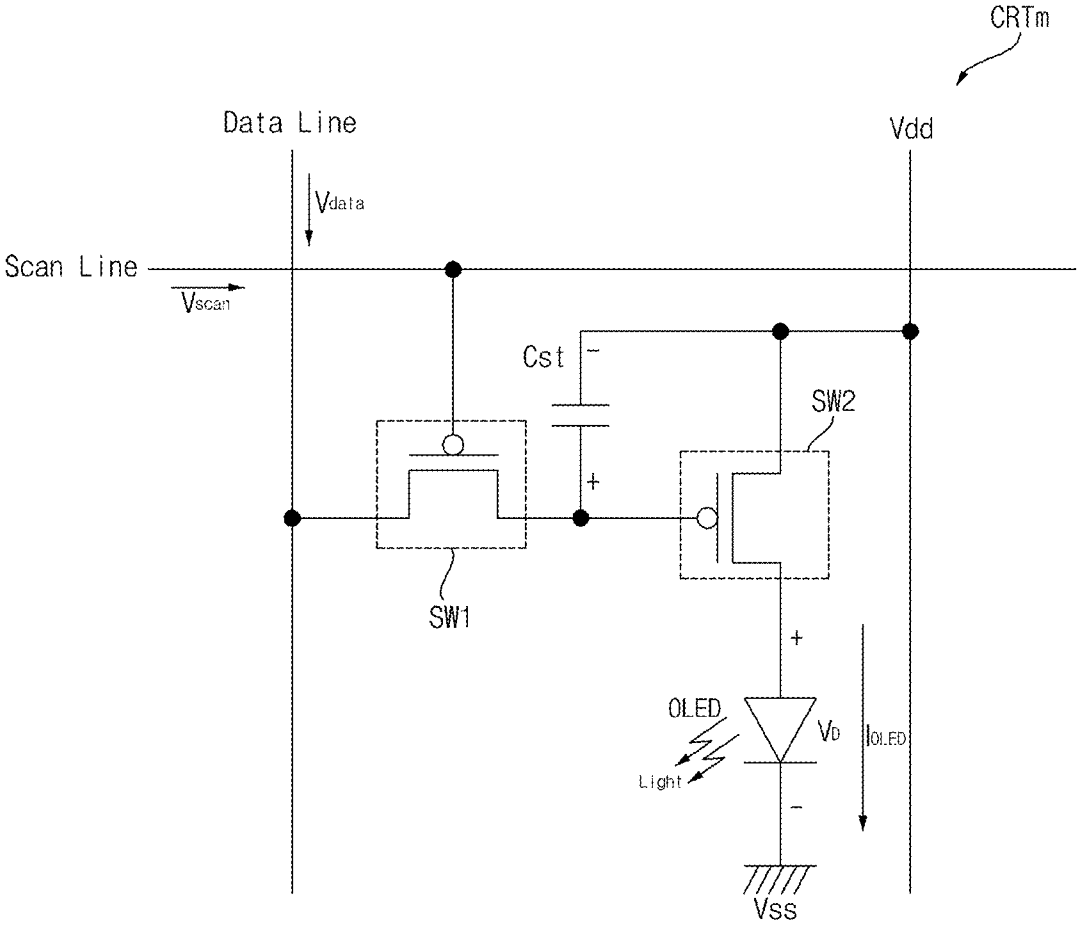

FIGS. 6A and 6B are diagrams referred to in the description of an organic light emitting panel of FIG. 5.

First, FIG. 6A is a diagram illustrating a pixel in the organic light emitting panel 210*b*.

Referring to the figure, the organic light emitting panel 210*b* may comprise a plurality of scan lines Scan1 to Scann and a plurality of data lines R1, G1, B1, W1 to Rm, Gm, Bin, Wm intersecting the scan lines.

Meanwhile, a pixel (subpixel) is defined in an intersecting area of the scan line and the data line in the organic light emitting panel 210*b*. In the figure, a pixel including subpixels SRi, SG1, SB1, and SW1 of RGBW is shown.

FIG. 6B illustrates a circuit of any one sub-pixel in the pixel of the organic light emitting panel of FIG. 6A.

Referring to the figure, an organic light emitting sub pixel circuit CRTm may comprise, as an active type, a scan switching element SW1, a storage capacitor Cst, a drive switching element SW2, and an organic light emitting layer OLED.

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC voltage (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a pulse width modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may comprise a light emitting layer (EML) of RGBW corresponding to a subpixel, and may comprise at least one of a hole injecting layer (HIL), a hole transporting layer (HTL), an electron transporting layer (ETL), and an electron injecting layer (EIL). In addition, it may comprise a hole blocking layer, and the like.

Meanwhile, the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further comprises green, red, and blue color filters. Meanwhile, since a white subpixel outputs a white light, a separate color filter is not required.

Meanwhile, in the figure, it is illustrated that a p-type MOSFET is used for a scan switching element SW1 and a drive switching element SW2, but an n-type MOSFET or other switching element, such as a JFET, IGBT, SIC, or the like are also available.

Meanwhile, the pixel may continuously emit light in the organic light emitting layer (OLED), after a scan signal is applied, during a unit display period, specifically, during a unit frame.

Figure 7:
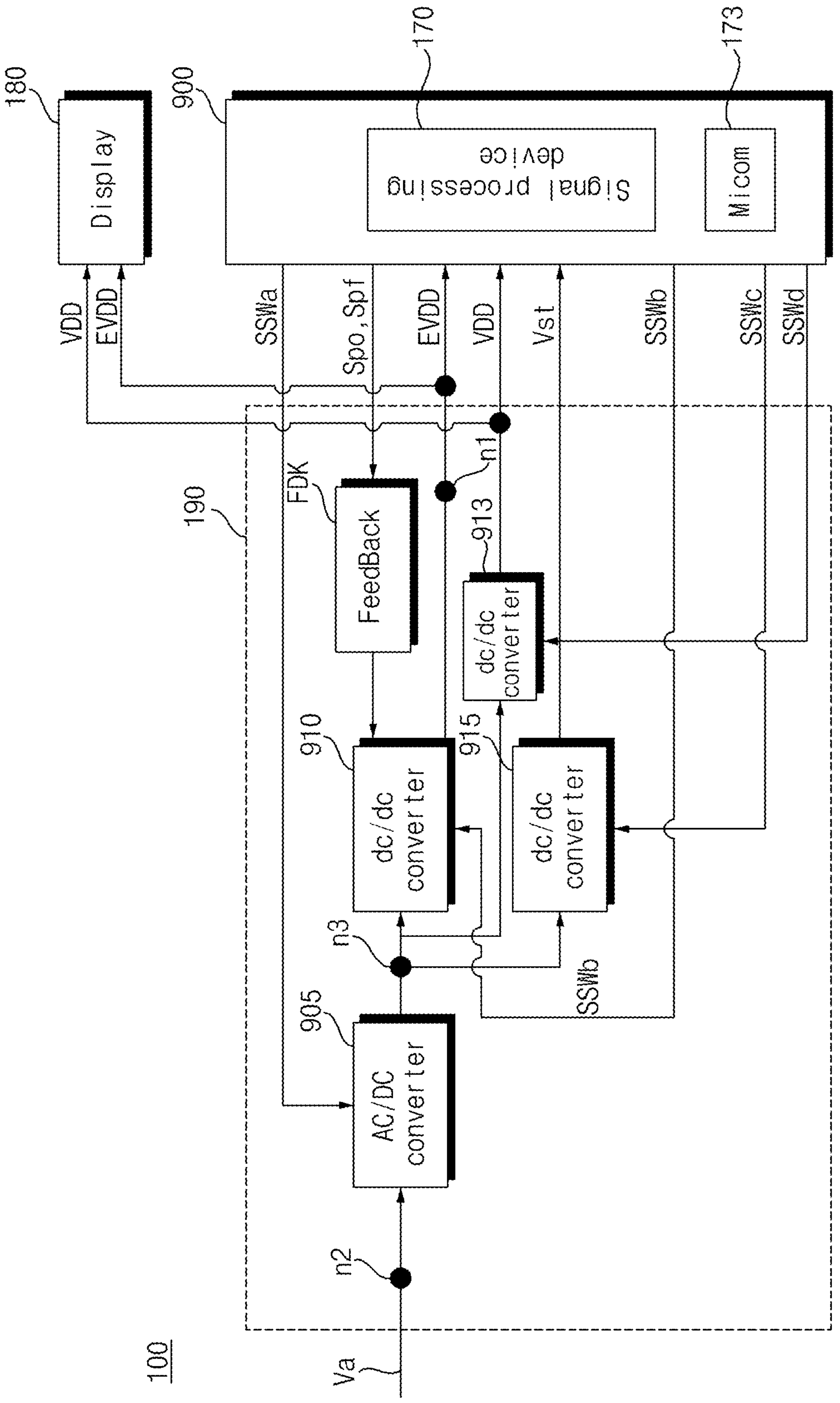
FIG. 7 is an exemplary internal block diagram of an image display apparatus according to an embodiment of the present disclosure.

FIG. 7 is an exemplary internal block diagram of a power supply according to an embodiment of the present disclosure.

Referring to the figure, the image display apparatus 100 according to an embodiment of the present disclosure comprises a display 180, a signal processing device 170 configured to output an image signal to the display 180, and a power supply 190 configured to supply a display driving voltage to the display 180.

The power supply 190 according to an embodiment of the present disclosure may comprise an ac/dc converter 905 for converting an input AC voltage into a DC voltage, and a dc/dc converter 910 for converting the level of the DC voltage from the ac/dc converter 905 to output a display driving voltage EVDD.

The figure illustrates that the ac/dc converter 905 is disposed between Node n2, which is an input terminal of the power supply 190, and an input node n3 of the dc/dc converter 910.

Meanwhile, an output node n1 of the ac/dc converter 905 may be electrically connected to the display 180.

The ac/dc converter 905 may comprise a diode or a switching element, and convert an input AC voltage Va into a DC voltage of a first level and output it.

The dc/dc converter 910 may converter an input DC voltage of the first level and output a display driving voltage VDD of a second level.

For example, the converter 910 may boost the DC voltage of the first level and output the display driving voltage EVDD of the second level higher than the first level.

On the one hand, in the case in which the display 180 is an organic light emitting panel, the display driving voltage EVDD may be a pixel driving voltage for an organic light emitting pixel.

Meanwhile, the image display apparatus 100 according to an embodiment of the present disclosure further comprises a main board 900 including a signal processing device 170 and a micom 173.

The signal processing device 170 may be configured to output an image signal to the display 180.

Upon receiving a remote control signal, the micom 173 may be operated to control the operation of the signal processing device 170 or the power supply 190.

The power supply 190 according to an embodiment of the present disclosure may be configured to output a micom driving voltage Vst for the operation of the micom 173.

To this end, the power supply 190 according to an embodiment of the present disclosure may further comprise a second dc/dc converter 915 for converting an input DC voltage of a first level to output a micom driving voltage Vst of a third level.

At this time, the micom driving voltage Vst may be lower than the display driving voltage EVDD.

Meanwhile, the mainboard 900 or the signal processing device 170 may be configured to output a display-on signal Spo or a display-off signal Spf to the power supply 190.

Accordingly, in the case in which the display 180 is on, the dc/dc converter 910 may be operated, and in the case in which the display 180 is off, the dc/dc converter 910 may stop operating.

On the one hand, the main board 900 or the signal processing device 170 may be configured to output a switch driving control signal SSwa to the ac/dc converter 905. Accordingly, the ac/dc converter 905 may be stably driven.

On the other hand, the mainboard 900 or the signal processing device 170 may be configured to output a switch driving control signal SSwb to the dc/dc converter 910. Accordingly, the dc/dc converter 910 may be stably driven.

On the other hand, the mainboard 900 or the signal processing device 170 may be configured to output a switch driving control signal SSwc to the second dc/dc converter 915. Accordingly, the second dc/dc converter 915 may be stably driven.

Meanwhile, the power supply 190 may further comprise a signal transmitter FDK connected between the converter 910 and the mainboard 900.

The signal transmitter FDK may receive a display-on signal Spo or a display-off signal Spf from the mainboard 900 including the signal processing device 170 or from the signal processing device 170, and transmit the display-on signal Spo or the display-off signal Spf to the converter 910.

The power supply 190 according to an embodiment of the present disclosure may further comprise a third dc/dc converter for converting an input DC voltage of a first level to output a gate driving voltage VDD of a fourth level.

In this case, the gate driving voltage VDD may be lower than the display driving voltage EVDD.

Meanwhile, the gate driving voltage VDD and the display driving voltage EVDD may be supplied to the display 180 which is separate from the main board 900.

Meanwhile, the gate driving voltage VDD and the display driving voltage EVDD may be supplied to the main board 900.

Meanwhile, the main board 900 or the signal processing device 170 may be configured to output a switch driving control signal SSwd to the third dc/dc converter 913. Accordingly, the third dc/dc converter 913 may be stably driven.

Figure 8A:
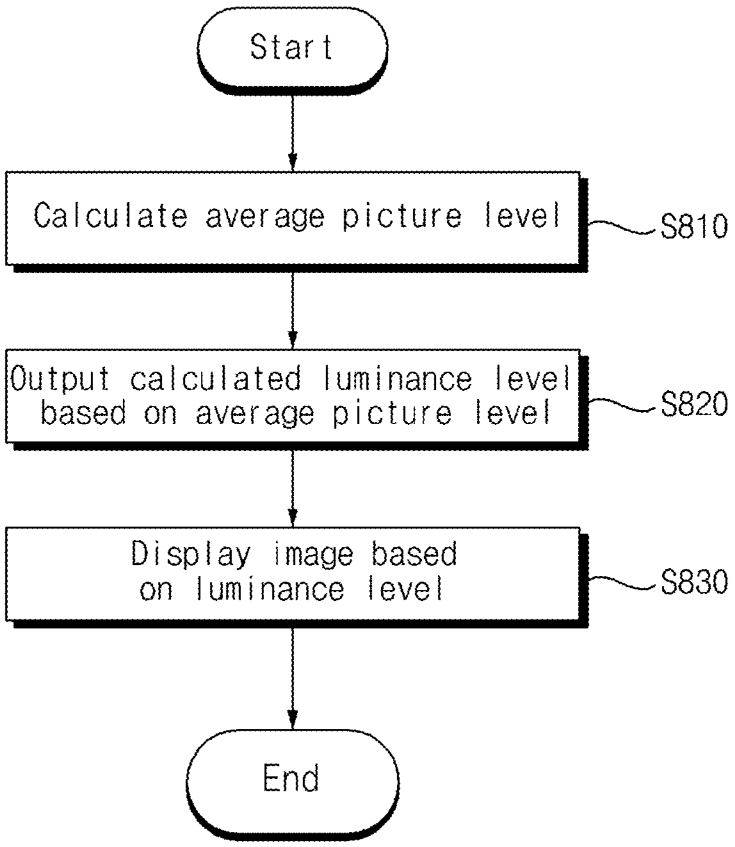
FIG. 8A is a sequential chart showing a method of operating an image display apparatus related to the present disclosure.

FIG. 8A is a sequential chart showing a method of operating an image display apparatus related to the present disclosure.

Referring to the drawing, in the case in which the an image display apparatus related to the present disclosure comprises an organic light emitting panel, it calculates the average picture level of an input image (S810), and outputs a luminance level calculated based on the average picture level (S820).

Also, the image display apparatus related to the present disclosure displays an image corresponding to the calculated luminance level (S830).

Figure 8B:
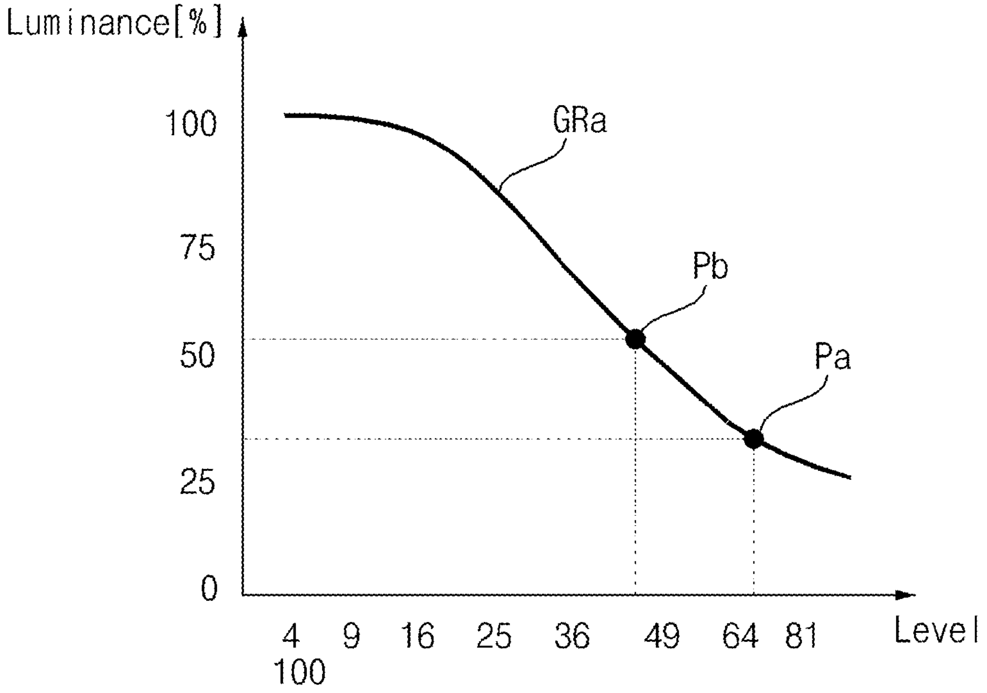
FIGS. 8B and 8C are diagrams referred to in the description of the operation of FIG. 8A.
Figure 8C:
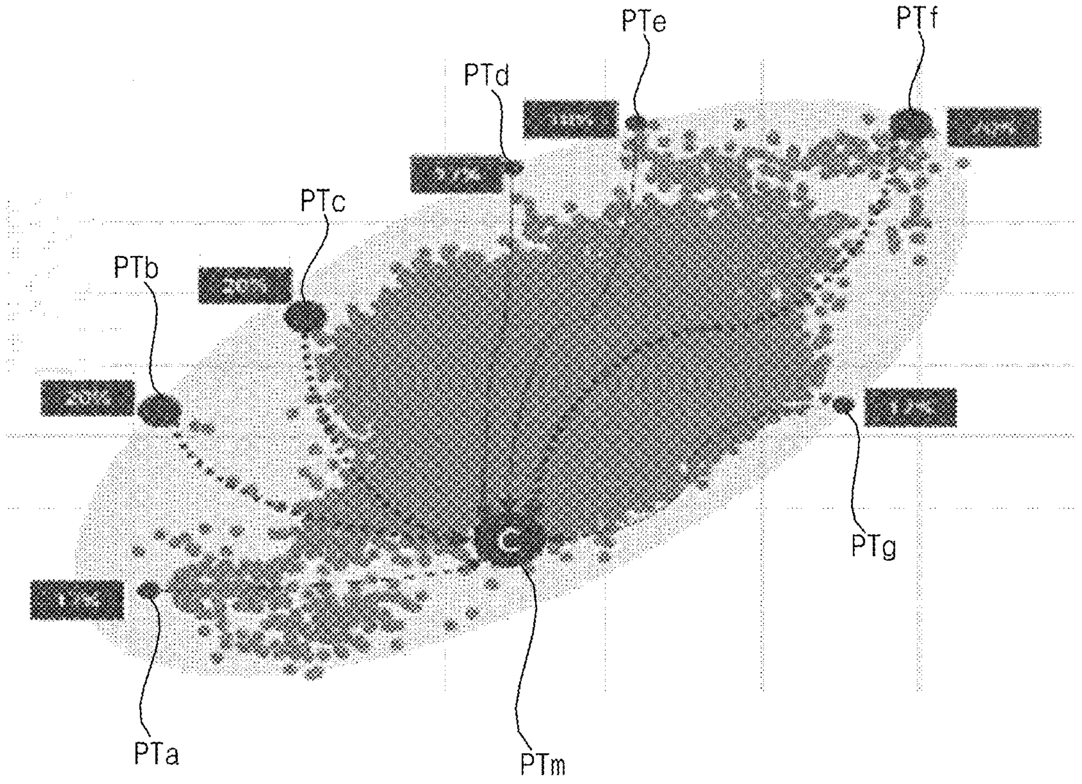

FIGS. 8B and 8C are diagrams referred to in the description of the operation of FIG. 8A.

FIG. 8B is a diagram illustrating luminance conversion based on average picture level.

Referring to the drawings, in the case in which the average picture level of the input image is approximately 64 levels, based on an APL graph GPa, the image display apparatus related to the present disclosure displays an image based on a level equivalent to about 30% of the maximum luminance, in order to reduce power consumption.

On the other hand, in the case in which the average picture level of the input image is approximately 48 levels, the image display apparatus related to the present disclosure displays an image based on a level equivalent to about 50% of the maximum luminance.

That is, the image display apparatus related to the present disclosure displays an image with a lower luminance level as the average picture level of the input image increases.

However, adjusting the luminance level according to the average picture level of the input image is disadvantageous in that it may cause luminance loss. In particular, since the organic light emitting panel has panel deviations, the luminance level is adjusted in consideration of these deviations, which may lead to a considerable loss in luminance.

FIG. 8C is a diagram illustrating panel deviations of an organic light emitting panel.

In particular, FIG. 8C illustrates luminance deviation based on color coordinates for a plurality of organic light-emitting panels.

Referring to the drawing, deviations from a reference luminance value PTm may occur, as in a plurality of luminance values PTa to PTg.

That is, the largest deviation in luminance from the reference luminance value PTm, among the plurality of luminance values PTa to PTg, may be approximately 20% of the reference luminance value PTm.

In view of this, the image display apparatus related to the present disclosure outputs a converted luminance level corresponding to the average picture level of the input image based on the APL graph GPa of FIG. 8B, considering that each organic light emitting panel has a luminance deviation of about 20%.

Accordingly, the image display apparatus related to the present disclosure may have further luminance loss due to panel deviations or the like.

In this regard, the present disclosure proposes a method for satisfying regulation on power consumption while reducing luminance loss, despite of panel deviations or the like.

To this end, the present disclosure proposes a method for increasing luminance level by adding an offset, based on a current corresponding to a display driving voltage EVDD outputted from the timing controller 232.

Figure 9A:
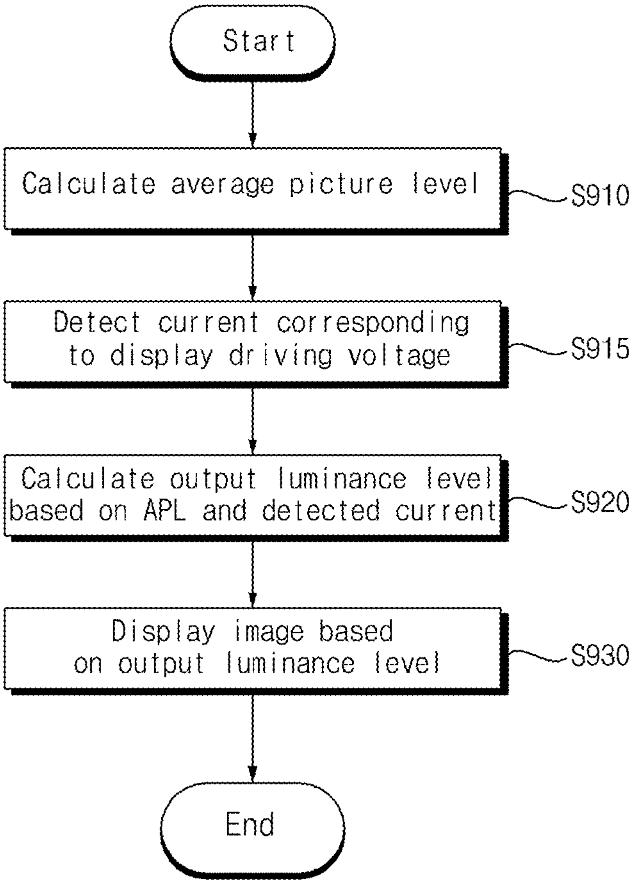
FIG. 9A is a sequential chart showing a method of operating an image display apparatus according to one embodiment of the present disclosure.

FIG. 9A is a sequential chart showing a method of operating an image display apparatus according to one embodiment of the present disclosure.

Referring to the drawing, the signal processing device 170 in the image display apparatus 180 according to an embodiment of the present disclosure calculates the average picture level of an input image (S910).

Next, the timing controller 232 detects a current corresponding to a display driving voltage EVDD (S915).

Meanwhile, the power supply 190 supplies the display driving voltage EVDD to the timing controller 232.

Meanwhile, the timing controller 232 may be configured to output a current corresponding to the display driving voltage EVDD from the power supply 190.

For example, the timing controller 232 may be configured to output a current corresponding to the display driving voltage EVDD from the power supply 190 to the data driver 236 or the organic light emitting panel 210.

Thus, the current corresponding to the display driving voltage EVDD flows through the pixels in the organic light emitting panel 210, thereby causing each pixel to emit light.

Meanwhile, the timing controller 232 detects a current corresponding to the display driving voltage EVDD when outputting the current corresponding to the display driving voltage EVDD.

Also, the timing controller 232 may transmit detected current information, which is information on the detected current, to the signal processing device 170.

For example, the timing controller 232 may transmit detected current information to the signal processing device 170 through I2C communication.

Next, the signal processing device 170 calculates a luminance level based on the average picture level of the input image and calculates output luminance level based on the calculated luminance level and the detected current information (S920), and the display 180 displays an image based on the output luminance level (S930).

Specifically, the signal processing device 170 calculates a luminance level based on the average picture level of the input image, calculate the output luminance level based on the luminance level regarding the average picture level and an offset level corresponding to the detected current information.

For example, the signal processing device 170 may be configured to, in the case in which the detected current information is lower than a reference level, increase the offset level as a difference between the detected current information and the reference level increases.

That is, the current outputted from the timing controller 232 is lower than the reference level, which is a target current level, and an actual luminance level shown on the display 180 decreases as a difference between the detected current information and the reference level increases.

To compensate for such a difference, the signal processing device 170 is configured to, when the current outputted from the timing controller 232 is lower than the reference level, which is the target current level, increase the offset level as a difference between the detected current information and the reference level increases.

Thus, when the current outputted from the timing controller 232 is lower than the reference level, which is the target current level, and the luminance level decreases as a difference between the detected current information and the reference level increases, but the luminance level may be increased to be similar to the target current level, in order to compensate for the difference.

Accordingly, it is possible to improve the luminance of the display 180 while satisfying regulation on power consumption. Also, it is possible to improve the luminance of the display 180 based on efficient calculation while satisfying regulation on power consumption. Furthermore, it is possible to improve the luminance of the display 180 in consideration of panel deviations while satisfying regulation on power consumption.

Figure 9B:
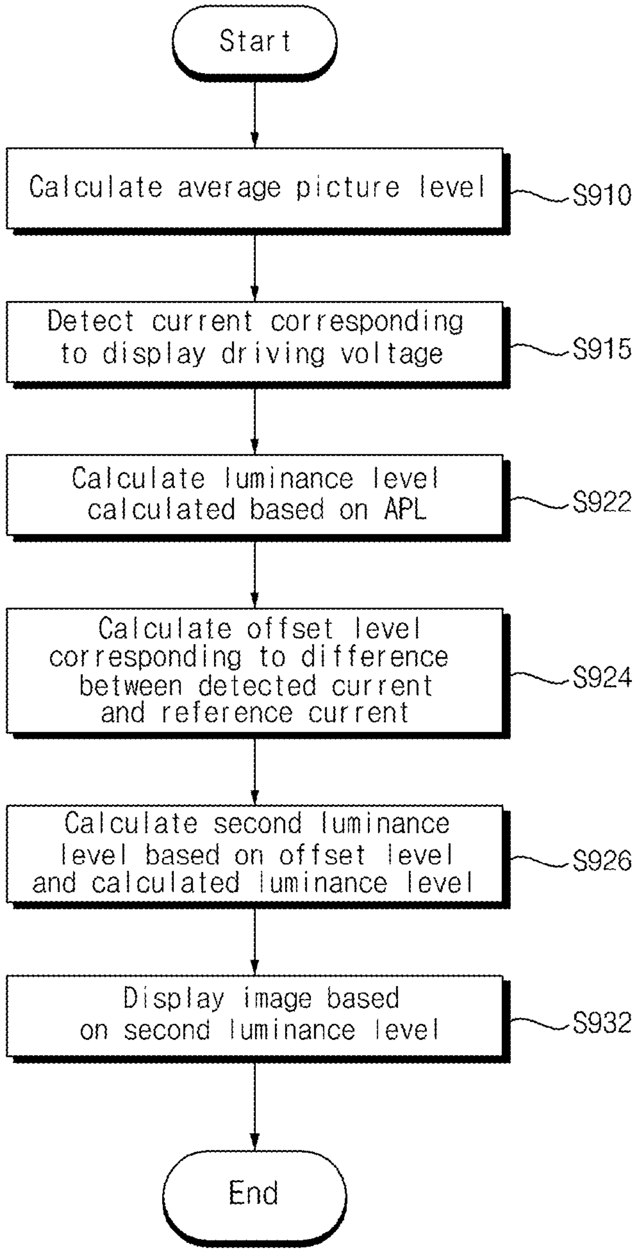
FIG. 9B is a sequential chart showing a method of operating an image display apparatus according to another embodiment of the present disclosure.

FIG. 9B is a sequential chart showing a method of operating an image display apparatus according to another embodiment of the present disclosure.

Referring to the drawing, the signal processing device 170 in the image display apparatus 180 according to an embodiment of the present disclosure calculates the average picture level of an input image (S910).

Next, the timing controller 232 detects a current corresponding to a display driving voltage EVDD (S915).

For example, a current output part 1024 in the timing controller 232 may be configured to output a current corresponding to the display driving voltage EVDD from the power supply 190 to the data driver 236 or the organic light emitting panel 210.

Also, a current detector 1026 in the timing controller 232 detects a current corresponding to the display driving voltage EVDD when outputting the current corresponding to the display driving voltage EVDD.

For example, the timing controller 232 may transmit detected current information to the signal processing device 170 through I2C communication.

Next, the signal processing device 170 may calculate a luminance level corresponding to the average picture level of the input image (S922).

Next, the signal processing device 170 may calculate an offset level corresponding to a difference between the detected current information and a reference level (S924).

Next, the signal processing device 170 may calculate and output a second luminance level, based on the luminance level corresponding to the average picture level and the offset level (S926).

For example, the signal processing device 170 may be configured to output the second luminance level by adding the luminance level corresponding to the average picture level and the offset level together.

Also, the signal processing device 170 may be configured to display an image based on the second luminance level (S932).

For example, the signal processing device 170 may be configured to output an image signal corresponding to the second luminance level, and the timing controller 232 may be configured to output an image data signal based on the image signal corresponding to the second luminance level.

Thus, an image corresponding to the second luminance level may be displayed on the organic light emitting panel 210.

Meanwhile, the signal processing device 170 may be configured to, when the detected current information is lower than the reference level, increase the offset level as a difference between the detected current information and the reference level increases.

Thus, when the current outputted from the timing controller 232 is lower than the reference level, which is the target current level, and the luminance level decreases as a difference between the detected current information and the reference level increases, but the luminance level may be increased to be similar to the target current level, in order to compensate for the difference.

Accordingly, it is possible to improve the luminance of the display 180 while satisfying regulation on power consumption. Also, it is possible to improve the luminance of the display 180 based on efficient calculation while satisfying regulation on power consumption. Furthermore, it is possible to improve the luminance of the display 180 in consideration of panel deviations while satisfying regulation on power consumption.

Figure 10:
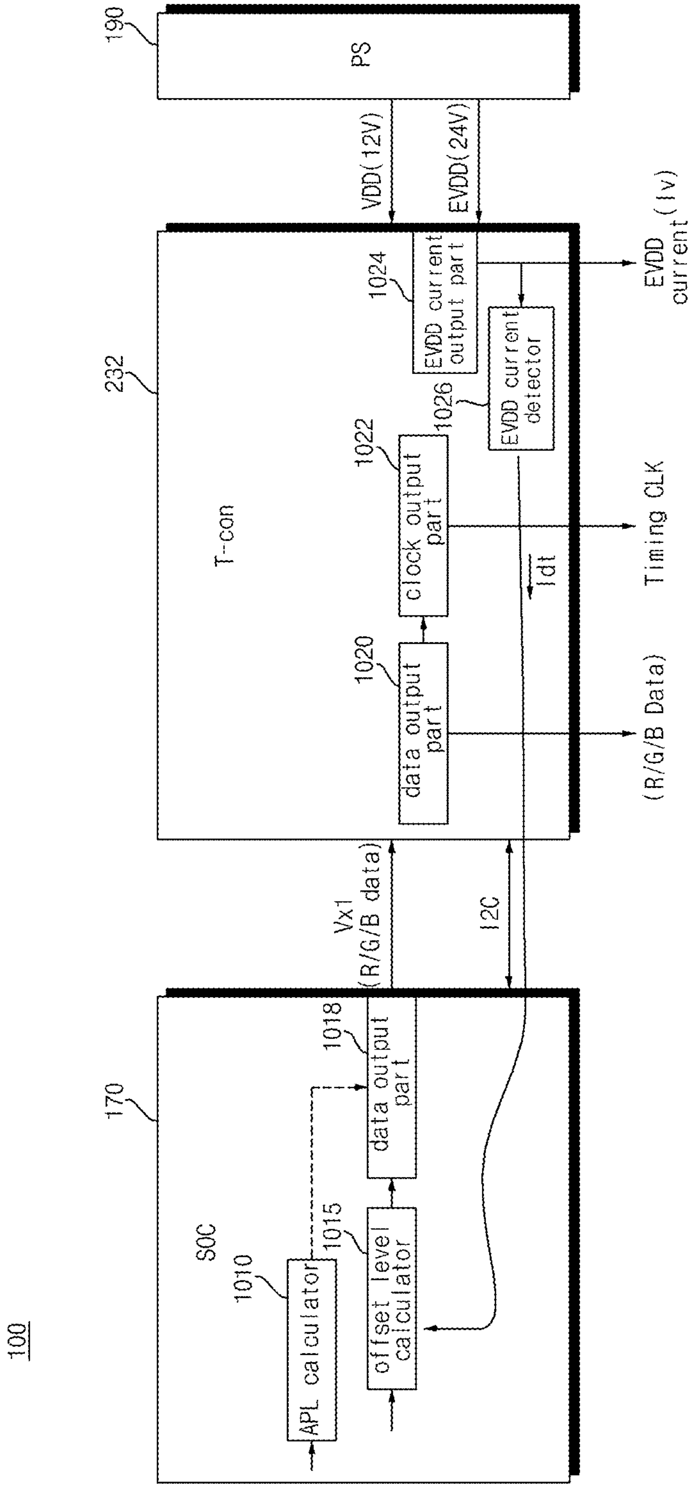
FIG. 10 is an exemplary internal block diagram of an image display apparatus according to an embodiment of the present disclosure.

FIG. 10 is an exemplary internal block diagram of an image display apparatus according to an embodiment of the present disclosure.

Referring to the drawing, the signal processing device 170 performs signal processing on an input image and output an image signal to the timing controller 232.

Meanwhile, the signal processing device 170 may comprise an average picture level calculator 1010 configured to calculate the average picture level of the input image, an offset level calculator 1015 configured to calculate the offset level based on the detected current information Idt from the timing controller 232, and a data output part 1018 configured to output an image signal corresponding to the output luminance level calculated based on the average picture level and the offset level.

Meanwhile, the power supply 190 supplies a display driving voltage EVDD to the timing controller 232.

Meanwhile, the power supply 190 may further supply a gate driving voltage VDD to the timing controller 232.

In this case, it is preferable that the voltage level of the display driving voltage EVDD is approximately 24V, higher than the gate driving voltage VDD which is approximately 12V.

Meanwhile, the timing controller 232 may drive the organic light emitting panel 210 based on an image signal from the signal processing device 170.

Meanwhile, the timing controller 232 may comprise a current output part 1024 configured to output a current lv corresponding to the display driving voltage EVDD from the power supply 190 and a current detector 1026 configured to detect a current corresponding to the display driving voltage EVDD.

Meanwhile, the timing controller 232 may transmit detected current information Idt to the signal processing device 170 through I2C communication.

Meanwhile, the timing controller 232 may further comprise a data output part 1020 configured to output an image data signal (RGB data) based on an image signal from the signal processing device 170 and a clock output part 1022 configured to output a clock signal (Timing CLK).

According to FIG. 10, the timing controller 232 may output a display driving voltage EVDD or a first current corresponding to the display driving voltage EVDD, detect the first current, and transmit detected current information Idt of the first current to the signal processing device 170.

Meanwhile, the signal processing device 170 according to an embodiment of the present disclosure may calculate a luminance level based on the average picture level of the input image, and calculate output luminance level based on the luminance level and an offset level corresponding to detected current information Idt which is detected corresponding to the display driving voltage EVDD by the timing controller 232.

Accordingly, it is possible to improve the luminance of the display 180 while satisfying regulation on power consumption. Also, it is possible to improve the luminance of the display 180 based on efficient calculation while satisfying regulation on power consumption. Furthermore, it is possible to improve the luminance of the display 180 in consideration of panel deviations while satisfying regulation on power consumption.

Meanwhile, the signal processing device 170 may be configured to, when the detected current information Idt is lower than a reference level, increase the offset level as a difference between the detected current information and the reference level increases. Accordingly, it is possible to improve the luminance of the display 180 based on the detected current while satisfying regulation on power consumption.

Meanwhile, in the case in which the detected current information Idt is equal to or higher than the reference level, the signal processing device 170 may be configured to output an image signal corresponding to the calculated luminance level based on the average picture level of the input image, without the offset level. Thus, regulation on power consumption can be satisfied.

Meanwhile, the signal processing device 170 may be configured to calculate a luminance level based on the average picture level of the input image, and calculate output luminance level based on the luminance level and an offset level corresponding to the detected current information Idt. Accordingly, it is possible to improve the luminance of the display 180 while satisfying regulation on power consumption. Also, it is possible to improve the luminance of the display 180 based on efficient calculation while satisfying regulation on power consumption. Furthermore, it is possible to improve the luminance of the display 180 in consideration of panel deviations while satisfying regulation on power consumption.

Meanwhile, the signal processing device 170 may be configured to decrease the offset level as the level of the display driving voltage EVDD increases. Accordingly, it is possible to improve the luminance of the display 180 based on the detected current while satisfying regulation on power consumption.

Figure 11A:
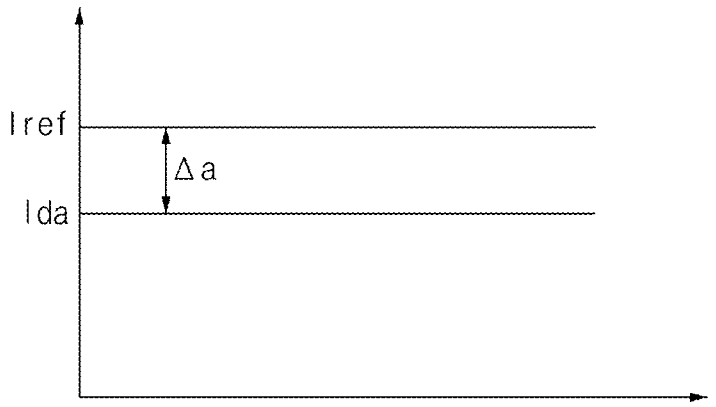
FIGS. 11A to 12 are diagrams referred to in the description of the operation of FIGS. 9A to 10.
Figure 11B:
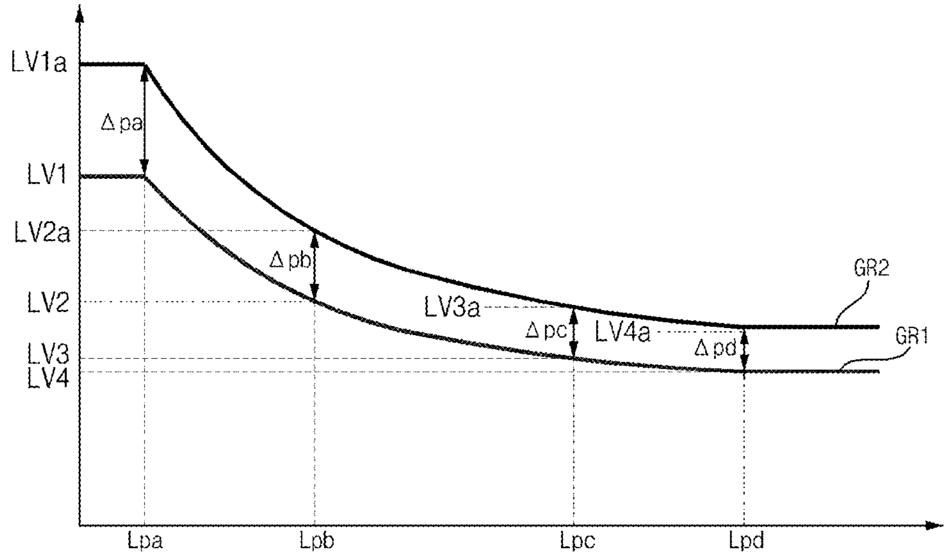
Figure 11C:
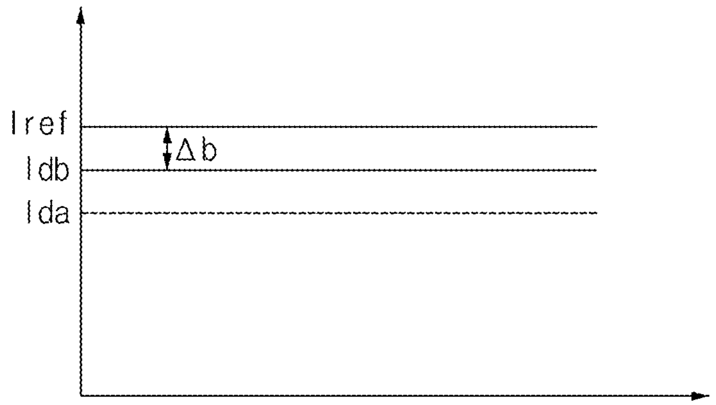
Figure 11D:
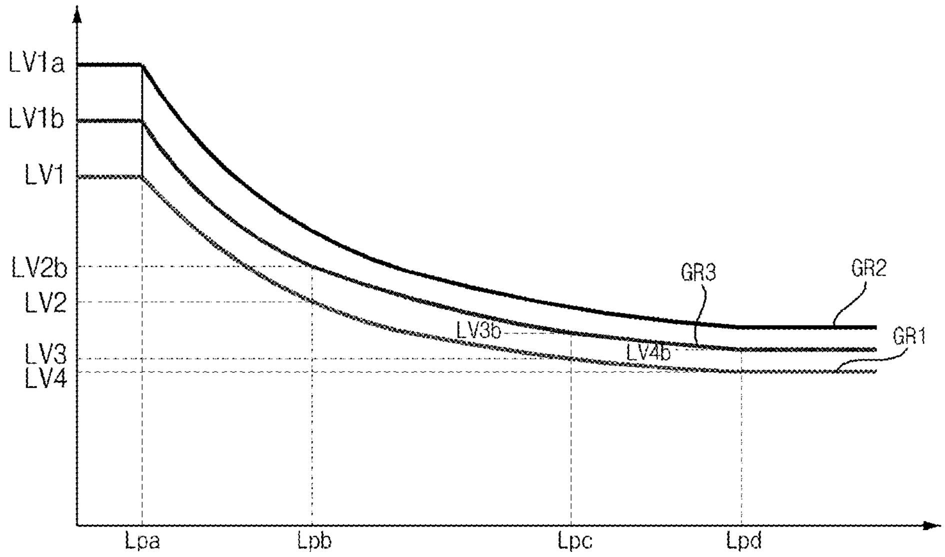
Figure 11E:
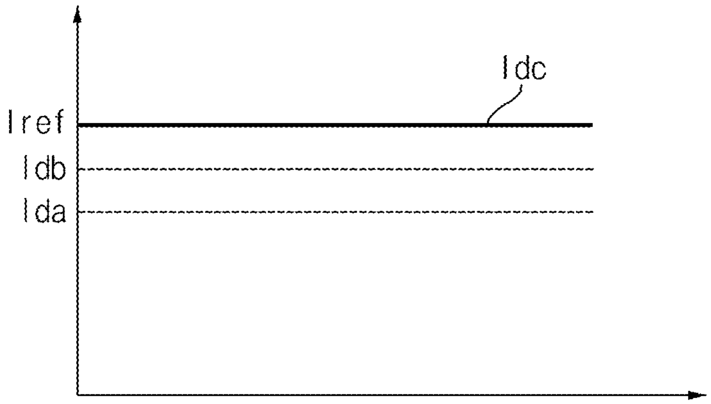
Figure 11F:
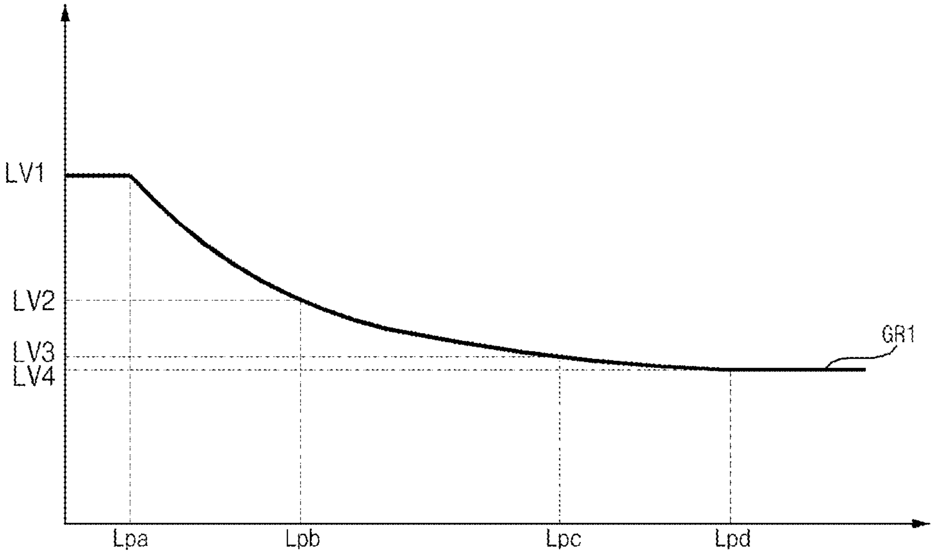
Figure 12:
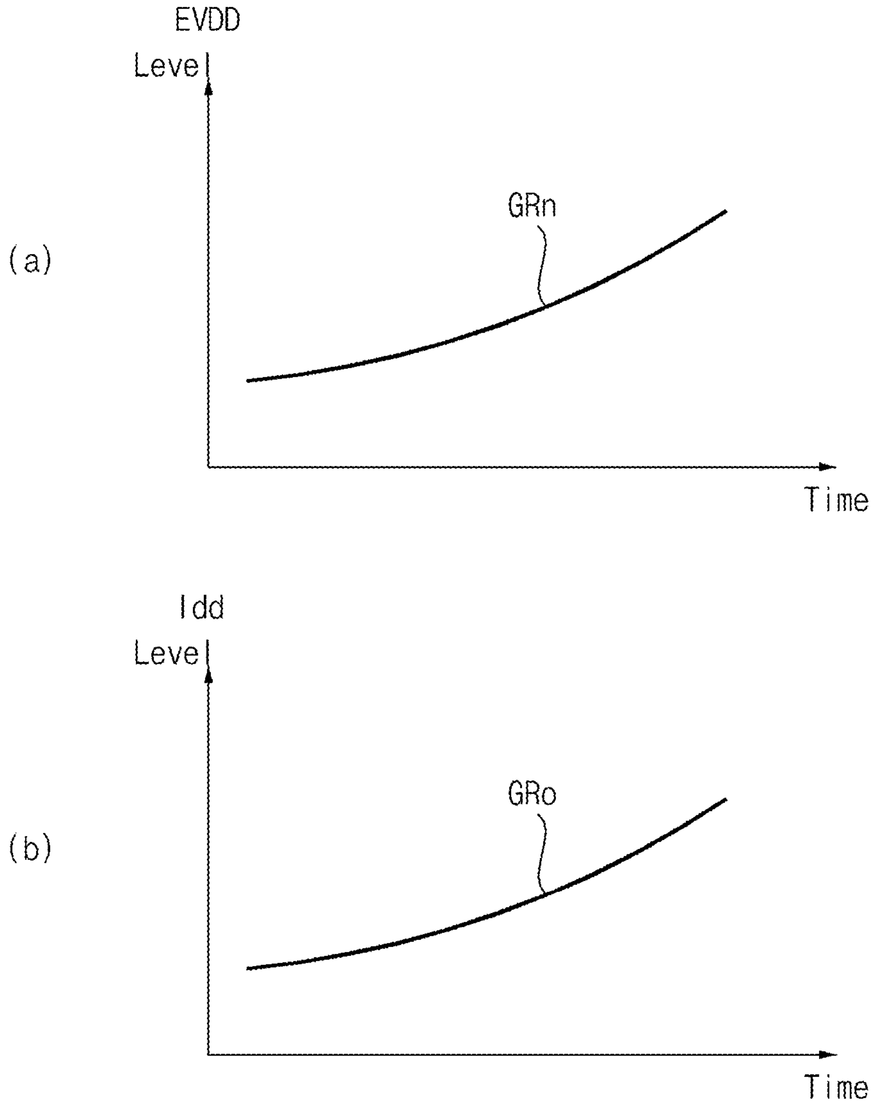

FIGS. 11A to 12 are diagrams referred to in the description of the operation of FIGS. 9A to 10.

FIG. 11A illustrates that the average picture level of the input image is a first level and the level of detected current information Idt is a second level lower than a reference level.

Referring to the drawing, in the case in which the average picture level of the input image is a first level and the level of detected current information Idt is a second level Ida lower than the reference level Iref, the signal processing device 170 may calculate a first offset level Δa corresponding to the second level.

FIG. 11B illustrates an APL graph corresponding to the first offset level Δa of FIG. 11A.

Referring to the drawing, in the case in which the average picture level of the input image is a first level, the signal processing device 170 may be configured to output a luminance level based on a first APL graph GR1.

Meanwhile, in the case in which the average picture level of the input image is the first level and the level of detected current information Idt is a second level Ida lower than the reference level Iref, the signal processing device 170 may be configured to output a luminance level based on a second APL graph GR2 in which the luminance level is increased by the first offset level Δa.

That is, the signal processing device 170 may be configured to output an image signal based on the first offset level Δa and the first level.

For example, the signal processing device 170 may be configured to output an image signal based on an output luminance level calculated by adding the first offset level Δa and the first level together.

Thus, the luminance level of an image shown on the display 180 can be increased by the first offset level Δa. That is, it is possible to improve the luminance of the display 180 based on the detected current while satisfying regulation on power consumption.

For example, in the case in which the average picture level of the input image is an Lpa level, the signal processing device 170 may be configured to output an image signal corresponding to a luminance level of LV1 and then, in the case in which the level of the detected current information Idt is the second level lower than the reference level, add an offset level of Δpa and output an image signal corresponding to a luminance level of LV1*a* higher than LV1.

As another example, in the case in which the average picture level of the input image is an Lpb level higher than Lpa, the signal processing device 170 may be configured to output an image signal corresponding to a luminance level of LV2 lower than LV1, and then, in the case in which the level of the detected current information Idt is the second level lower than the reference level, add an offset level of Δpb lower than Δpa and output an image signal corresponding to a luminance level of LV2*a* higher than LV2.

As yet another example, in the case in which the average picture level of the input image is an Lpc level higher than Lpb, the signal processing device 170 may be configured to output an image signal corresponding to a luminance level of LV3 lower than LV2, and then, in the case in which the level of the detected current information Idt is the second level lower than the reference level, add an offset level of Δpc lower than Δpb and output an image signal corresponding to a luminance level of LV3*a* higher than LV3.

As a further example, in the case in which the average picture level of the input image is an Lpd level higher than Lpc, the signal processing device 170 may be configured to output an image signal corresponding to a luminance level of LV4 lower than LV3, and then, in the case in which the level of the detected current information Idt is the second level lower than the reference level, add an offset level of Δpd lower than Δpc and output an image signal corresponding to a luminance level of LV4*a* higher than LV4.

That is, the signal processing device 170 may be configured to decrease the offset level as the average picture level of the input image increases.

For example, in the case in which the average picture level of the input image is a first level LV1 and the level of the detected current information Idt is a second level Ida lower than the reference level, the signal processing device 170 may be configured to output an image signal based on the first offset level Δpa, which corresponds to the second level Ida, and the first level, and in the case in which the average picture level of the input image is a third level LV3 higher than the first level LV1 and the level of the detected current information Idt is the second level lower than the reference level, may be configured to output an image signal based on the second offset level Δpc, lower than the first offset level Δpa, and the third level. Accordingly, it is possible to improve the luminance of the display 180 based on the detected current while satisfying regulation on power consumption.

FIG. 11C illustrates that the average picture level of the input image is a first level and the level of detected current information Idt is a third level lower than a reference level and higher than a second level.

Referring to the drawing, in the case in which the average picture level of the input image is a first level and the level of detected current information Idt is a third level Idb lower than the reference level Iref and higher than the second level Ida, the signal processing device 170 may calculate a second offset level Δb corresponding to the third level.

In this case, the signal processing device 170 may be configured to the second offset level Δb is lower than the first offset level Δa. Accordingly, it is possible to improve the luminance of the display 180 based on the detected current while satisfying regulation on power consumption.

FIG. 11D illustrates an APL graph corresponding to the second offset level Δb of FIG. 11C.

Referring to the drawing, in the case in which the average picture level of the input image is a first level, the signal processing device 170 may be configured to output a luminance level based on the first APL graph GR1.

Meanwhile, in the case in which the average picture level of the input image is a first level and the level of the detected current information Idt is a third level Idb lower than the reference level Iref and higher than the second level Ida, the signal processing device 170 may be configured to output a luminance level based on a third APL graph GR3 in which the luminance level is increased by the second offset level Δb.

In this case, the third APL graph GR3 may show a lower level than the second APL graph GR2.

That is, the signal processing device 170 may be configured to output an image signal based on the third APL graph GR3 and the first level.

For example, the signal processing device 170 may be configured to output an image signal based on an output luminance level calculated by adding the second offset level Δb and the first level together.

Thus, the luminance level of an image shown on the display 180 can be increased by the second offset level Δb. That is, it is possible to improve the luminance of the display 180 based on the detected current while satisfying regulation on power consumption.

For example, in the case in which the average picture level of the input image is an Lpa level, the signal processing device 170 may be configured to output an image signal corresponding to a luminance level of LV1 and then, in the case in which the level of the detected current information Idt is the third level lower than the reference level and higher than the second level, may add an offset level and output an image signal corresponding to a luminance level of LV1*b* higher than LV1. In this case, LV1*b* may be lower than LV1*a*.

As another example, in the case in which the average picture level of the input image is an Lpb level higher than Lpa, the signal processing device 170 may be configured to output an image signal corresponding to a luminance level of LV2 lower than LV1, and then, in the case in which the level of the detected current information Idt is the third level lower than the reference level and higher than the second level, may add an offset level and output an image signal corresponding to a luminance level of LV2*b* higher than LV2. In this case, LV2*b* may be lower than LV2*a*.

As yet another example, in the case in which the average picture level of the input image is an Lpc level higher than Lpb, the signal processing device 170 may be configured to output an image signal corresponding to a luminance level of LV3 lower than LV2, and then, in the case in which the level of the detected current information Idt is the third level lower than the reference level and higher than the second level, may add an offset level and output an image signal corresponding to a luminance level of LV3*b* higher than LV3. In this case, LV3*b* may be lower than LV3*a*.

As a further example, in the case in which the average picture level of the input image is an Lpd level higher than Lpc, the signal processing device 170 may be configured to output an image signal corresponding to a luminance level of LV4 lower than LV3, and then, in the case in which the level of the detected current information Idt is the third level lower than the reference level and higher than the second level, may add an offset level and output an image signal corresponding to a luminance level of LV4*b* higher than LV4. In this case, LV4*b* may be lower than LV4*a*.

That is, the signal processing device 170 may be configured to decrease the offset level as the average picture level of the input image increases.

Also, the signal processing device 170 may be configured to, when the average picture level of the input image is constant and the detected current information Idt is lower than the reference level, increase the offset level as a difference between the detected current information and the reference level increases.

That is, the signal processing device 170 may be configured to, when the average picture level of the input image is constant and the detected current information Idt is lower than the reference level, decrease the offset level as the difference becomes smaller. Accordingly, it is possible to improve the luminance of the display 180 based on the detected current while satisfying regulation on power consumption.

FIG. 11E illustrates that the average picture level of the input image is a first level and the level of detected current information Idt is a fourth level equal to or higher than a reference level.

Referring to the drawing, in the case in which the average picture level of the input image is a first level and the level of detected current information Idt is a fourth level equal to or higher than the reference level Iref, the signal processing device 170 may calculate the offset level to be zero or may not calculate the offset level.

FIG. 11F illustrates an APL graph corresponding to FIG. 11E.

Referring to the drawing, in the case in which the average picture level of the input image is a first level, the signal processing device 170 may be configured to output a luminance level based on the first APL graph GR1.

Meanwhile, in the case in which the average picture level of the input image is a first level and the detected current information Idt is a fourth level equal to or higher than the reference level Iref, the signal processing device 170 may be configured to output an image signal corresponding to the first level.

That is, in the case in which the average picture level of the input image is a first level and the detected current information Idt is a fourth level equal to or higher than the reference level Iref, the signal processing device 170 may be configured to output a luminance level based on the first APL graph GR1.

Accordingly, it is possible to improve the luminance of the display 180 based on the detected current while satisfying regulation on power consumption.

For example, in the case in which the average picture level of the input image is an Lpa level, the signal processing device 170 may be configured to output an image signal corresponding to a luminance level of LV1 and then, in the case in which the level of the detected current information Idt is the fourth level equal to or higher than the reference level, may be configured to output an image signal corresponding to the luminance level of LV1 without adding an offset level.

As another example, in the case in which the average picture level of the input image is an Lpb level higher than Lpa, the signal processing device 170 may be configured to output an image signal corresponding to a luminance level of LV2 lower than LV1, and then, in the case in which the level of the detected current information Idt is the fourth level equal to or higher than the reference level, may be configured to output an image signal corresponding to the luminance level of LV2 without adding an offset level.

As yet another example, in the case in which the average picture level of the input image is an Lpc level higher than Lpb, the signal processing device 170 may be configured to output an image signal corresponding to a luminance level of LV3 lower than LV2, and then, in the case in which the level of the detected current information Idt is the fourth level equal to or higher than the reference level, may be configured to output an image signal corresponding to the luminance level of LV3 without adding an offset level.

As a further example, in the case in which the average picture level of the input image is an Lpd level higher than Lpc, the signal processing device 170 may be configured to output an image signal corresponding to a luminance level of LV4 lower than LV3, and then, in the case in which the level of the detected current information Idt is the fourth level equal to or higher than the reference level, may be configured to output an image signal corresponding to the luminance level of LV4 without adding an offset level.

That is, the signal processing device 170 may be configured to decrease the luminance level of the image signal outputted from the signal processing device 170 as the average picture level increases. Accordingly, it is possible to improve the luminance of the display 180 while satisfying regulation on power consumption.

FIG. 12 illustrates that the level of the display driving voltage EVDD or the current corresponding to the display driving voltage EVDD increases as cumulative operating period of the display increases 180.

(a) of FIG. 12 illustrates that the level of the display driving voltage EVDD increases as cumulative operating period of the display increases 180 based on the organic light emitting panel 210.

Referring to the drawing, the signal processing device 170 may be configured to control the power supply 190 to increase the level of the display driving voltage EVDD as cumulative operating period of the display increases 180 based on the organic light emitting panel 210, in order to prevent deterioration.

In this case, the signal processing device 170 may be configured to decrease the offset level as the level of the display driving voltage EVDD increases. Accordingly, it is possible to improve the luminance of the display 180 based on the detected current while satisfying regulation on power consumption.

That is, the signal processing device 170 may be configured to decrease the offset level as cumulative operating period of the display increases 180. Accordingly, it is possible to improve the luminance of the display 180 based on the detected current while satisfying regulation on power consumption.

(b) of FIG. 12 illustrates that the level of the display driving current Idd increases as cumulative operating period of the display increases 180 based on the organic light emitting panel 210.

Referring to the drawing, the signal processing device 170 may be configured to control the power supply 190 to increase the level of the display driving current Idd as cumulative operating period of the display increases 180 based on the organic light emitting panel 210, in order to prevent deterioration.

In this case, the signal processing device 170 may be configured to decrease the offset level as the level of the display driving current Idd increases. Accordingly, it is possible to improve the luminance of the display 180 based on the detected current while satisfying regulation on power consumption.

That is, the signal processing device 170 may be configured to decrease the offset level as cumulative operating period of the display increases 180. Accordingly, it is possible to improve the luminance of the display 180 based on the detected current while satisfying regulation on power consumption.

Figure 13:
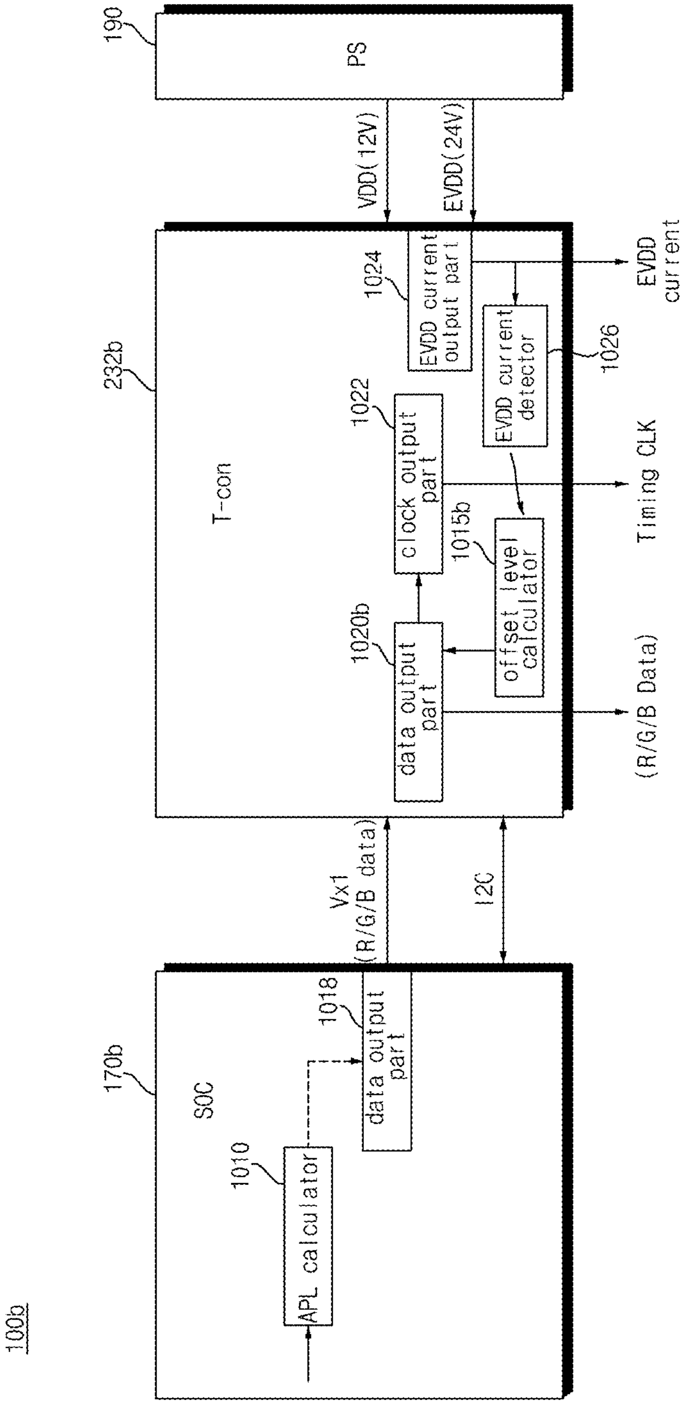
FIG. 13 is an exemplary internal block diagram of an image display apparatus according to another embodiment of the present disclosure.

FIG. 13 is an exemplary internal block diagram of an image display apparatus according to another embodiment of the present disclosure.

Referring to the drawing, an image display apparatus 100*b* according to another embodiment of the present disclosure comprises an organic light emitting panel 210, a signal processing device 170*b* configured to perform signal processing on an input image and output an image signal, a timing controller 232*b* configured to drive the organic light emitting panel 210 based on the image signal from the signal processing device 170*b*, and a power supply 190 configured to supply a display driving voltage EVDD to the timing controller 232*b*.

Incidentally, the signal processing device 170*b* of FIG. 13 does not comprise an offset level calculator 1015 as opposed to FIG. 10.

Instead, the timing controller 232*b* of FIG. 13 comprises an offset level calculator 1015*b* unlike in FIG. 10.

That is, the signal processing device 170*b* of FIG. 13 may comprise an average picture level calculator 1010 configured to calculate the average picture level of the input image and a data output part 1018 configured to output an image signal corresponding to a luminance level based on the average picture level.

Meanwhile, the timing controller 232*b* according to another embodiment of the present disclosure may comprise a current output part 1024 configured to output a current Iv corresponding to a display driving voltage EVDD from the power supply 190, a current detector 1026 configured to detect a current corresponding to the display driving voltage EVDD, and an offset level calculator 1015 configured to calculate the offset level based on the detected current information Idt from the current detector 1026.

Meanwhile, the timing controller 232*b* may further comprise a data output part 1020*b* configured to output an image data signal (RGB data) based on an image signal from the signal processing device 170 and a clock output part 1022 configured to output a clock signal (Timing CLK).

Meanwhile, the timing controller 232*b* according to another embodiment of the present disclosure may configured to calculate a luminance level based on the average picture level of the input image, calculate output luminance level based on the luminance level and an offset level corresponding to current information Idt detected in response to the display driving voltage EVDD in the timing controller 232*b*, and output an image data signal (RGB data) corresponding to the output luminance level.

Accordingly, it is possible to improve the luminance of the display 180 while satisfying regulation on power consumption. Also, it is possible to improve the luminance of the display 180 based on efficient calculation while satisfying regulation on power consumption. Furthermore, it is possible to improve the luminance of the display 180 in consideration of panel deviations while satisfying regulation on power consumption.

Meanwhile, the timing controller 232*b* may be configured to, in the case in which the detected current information Idt is lower than a reference level, increase the offset level as a difference between the detected current information and the reference level increases. Accordingly, it is possible to improve the luminance of the display 180 based on the detected current while satisfying regulation on power consumption.

Meanwhile, in the case in which the detected current information Idt is equal to or higher than the reference level, the timing controller 232*b* may be configured to output an image data signal corresponding to the calculated luminance level based on the average picture level of the input image, without the offset level. Thus, regulation on power consumption can be satisfied.

Meanwhile, in the case in which the average picture level of the input image is a first level and the detected current information Idt is a second level lower than the reference level, the timing controller 232*b* may be configured to output an image signal (RGB data) based on the first level and a first offset level corresponding to the second level. Accordingly, it is possible to improve the luminance of the display 180 based on the detected current while satisfying regulation on power consumption.

Meanwhile, in the case in which the average picture level of the input image is the first level and the detected current information Idt is a third level lower than the reference level and higher than the second level, the timing controller 232*b* may be configured to output an image signal (RGB data) based on the first level and a second offset level corresponding to the third level. Accordingly, it is possible to improve the luminance of the display 180 based on the detected current while satisfying regulation on power consumption.

Meanwhile, the timing controller 232*b* may comprise a current detector 1026 configured to detect an output current corresponding to the display driving voltage EVDD, an offset level calculator 1015 configured to calculate the offset level based on the detected current information Idt from the current detector 1026, and a data output part 1018 configured to output an image data signal (RGB data) corresponding to the output luminance level calculated based on the average picture level and the offset level. Accordingly, it is possible to improve the luminance of the display 180 based on the detected current while satisfying regulation on power consumption.

Meanwhile, the timing controller 232*b* may be configured to the luminance level of the image data signal becomes lower as the average picture level increases. Accordingly, it is possible to improve the luminance of the display 180 while satisfying regulation on power consumption.

Meanwhile, the timing controller 232*b* may be configured to the offset level becomes lower as the level of the display driving voltage EVDD increase. Accordingly, it is possible to improve the luminance of the display 180 based on the detected current while satisfying regulation on power consumption.

Meanwhile, the timing controller 232*b* may be configured to decrease the offset level as cumulative operating period of the display increases 180. Accordingly, it is possible to improve the luminance of the display 180 based on the detected current while satisfying regulation on power consumption.

As described above, an image display apparatus according to an embodiment of the present disclosure comprises: an image display apparatus including: an organic light emitting panel; a signal processing device configured to perform signal processing on an input image and output an image signal; a timing controller configured to drive the organic light emitting panel based on the image signal from the signal processing device; and a power supply configured to supply a display driving voltage to the timing controller, wherein the signal processing device is configured to calculate a luminance level based on the average picture level of the input image, calculate output luminance level based on the luminance level and an offset level corresponding to current information detected in response to the display driving voltage in the timing controller, and output an image signal corresponding to the output luminance level. Accordingly, it is possible to improve the luminance of the display while satisfying regulation on power consumption. Also, it is possible to improve the luminance of the display based on efficient calculation while satisfying regulation on power consumption. Furthermore, it is possible to improve the luminance of the display in consideration of panel deviations while satisfying regulation on power consumption.

Meanwhile, the signal processing device may be configured to, in the case in which the detected current information is lower than a reference level, increase the offset level as a difference between the detected current information and the reference level increases. Accordingly, it is possible to improve the luminance of the display based on the detected current while satisfying regulation on power consumption.

Meanwhile, in the case in which the detected current information is equal to or higher than the reference level, the signal processing device may be configured to output an image signal corresponding to the calculated luminance level based on the average picture level of the input image, without the offset level. Accordingly, regulation on power consumption can be satisfied.

Meanwhile, in the case in which the average picture level of the input image is a first level and the level of the detected current information is a second level lower than a reference level, the signal processing device may be configured to output an image signal based on the first level and a first offset level corresponding to the second level. Accordingly, it is possible to improve the luminance of the display based on the detected current while satisfying regulation on power consumption.

Meanwhile, in the case in which the average picture level of the input image is the first level and the level of the detected current information is a third level lower than the reference level and higher than the second level, the signal processing device may be configured to output an image signal based on the first level and a second offset level corresponding to the third level. Accordingly, it is possible to improve the luminance of the display based on the detected current while satisfying regulation on power consumption.

Meanwhile, the signal processing device may be configured to the second offset level is lower than the first offset level. Accordingly, it is possible to improve the luminance of the display based on the detected current while satisfying regulation on power consumption.

Meanwhile, in the case in which the average picture level of the input image is a first level and the level of the detected current information is a fourth level equal to or higher than the reference level, the signal processing device may be configured to output an image signal corresponding to the first level. Accordingly, it is possible to improve the luminance of the display based on the detected current while satisfying regulation on power consumption.

Meanwhile, the signal processing device may be configured to decrease the luminance level of the image signal outputted from the signal processing device as the average picture level increases. Accordingly, it is possible to improve the luminance of the display while satisfying regulation on power consumption.

Meanwhile, in the case in which the average picture level of the input image is a first level and the level of the detected current information is a second level lower than a reference level, the signal processing device may be configured to output an image signal based on the first level and a first offset level corresponding to the second level, and in the case in which the average picture level of the input image is a third level higher than the first level and the level of the detected current information is the second level lower than the reference level, the signal processing device may be configured to output an image signal based on the third level and a second offset level lower than the first offset level. Accordingly, it is possible to improve the luminance of the display based on the detected current while satisfying regulation on power consumption.

Meanwhile, the signal processing device may be configured to decrease the offset level as the level of the display driving voltage increases. Accordingly, it is possible to improve the luminance of the display based on the detected current while satisfying regulation on power consumption.

Meanwhile, the signal processing device may be configured to decrease the offset level as cumulative operating period of the display increases. Accordingly, it is possible to improve the luminance of the display based on the detected current while satisfying regulation on power consumption.

Meanwhile, the signal processing device may comprise: an average picture level calculator configured to calculate the average picture level of the input image; an offset level calculator configured to calculate the offset level based on the detected current information from the timing controller; and a data output part configured to output an image signal corresponding to the output luminance level calculated based on the average picture level and the offset level. Accordingly, it is possible to improve the luminance of the display based on the detected current while satisfying regulation on power consumption.

According to another embodiment of the present disclosure, an image display apparatus comprises: an organic light emitting panel; a signal processing device configured to perform signal processing on an input image and output an image signal; a timing controller configured to drive the organic light emitting panel based on the image signal from the signal processing device; and a power supply configured to supply a display driving voltage to the timing controller, wherein the timing controller is configured to output the display driving voltage or a first current corresponding to the display driving voltage, detect the first current, and transmit detected current information of the first current to the signal processing device, and the signal processing device is configured to calculate a luminance level based on the average picture level of the input image, calculate output luminance level based on the luminance level and an offset level corresponding to the detected current information, and output an image signal corresponding to the output luminance level. Accordingly, it is possible to improve the luminance of the display while satisfying regulation on power consumption. Also, it is possible to improve the luminance of the display based on efficient calculation while satisfying regulation on power consumption. Furthermore, it is possible to improve the luminance of the display in consideration of panel deviations while satisfying regulation on power consumption.

According to yet another embodiment of the present disclosure provides an image display apparatus including: an organic light emitting panel; a signal processing device configured to perform signal processing on an input image and output an image signal; a timing controller configured to drive the organic light emitting panel based on the image signal from the signal processing device; and a power supply configured to supply a display driving voltage to the timing controller, wherein the timing controller is configured to calculate a luminance level based on the average picture level of the input image, calculate output luminance level based on the luminance level and an offset level corresponding to current information detected in response to the display driving voltage in the timing controller, and output an image signal corresponding to the output luminance level. Accordingly, it is possible to improve the luminance of the display while satisfying regulation on power consumption. Also, it is possible to improve the luminance of the display based on efficient calculation while satisfying regulation on power consumption. Furthermore, it is possible to improve the luminance of the display in consideration of panel deviations while satisfying regulation on power consumption.

Meanwhile, in the case in which the average picture level of the input image is a first level and the level of the detected current information is a second level lower than a reference level, the signal processing device may be configured to output an image data signal based on the first level and a first offset level corresponding to the second level. Accordingly, it is possible to improve the luminance of the display based on the detected current while satisfying regulation on power consumption.

Meanwhile, in the case in which the average picture level of the input image is the first level and the level of the detected current information is a third level lower than the reference level and higher than the second level, the signal processing device may be configured to output an image data signal based on the first level and a second offset level corresponding to the third level.

Meanwhile, the timing controller may comprise: a current detector configured to detect an output current corresponding to the display driving voltage; an offset level calculator configured to calculate the offset level based on detected current information from the current detector; and a data output part configured to output an image data signal corresponding to the output luminance level calculated based on the average picture level and the offset level. Accordingly, it is possible to improve the luminance of the display based on the detected current while satisfying regulation on power consumption.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:

1. An image display apparatus comprising:

an organic light emitting panel;

a signal processing device configured to perform signal processing on an input image and output an image signal;

a timing controller configured to drive the organic light emitting panel based on the image signal from the signal processing device; and a power supply configured to supply a display driving voltage to the timing controller, wherein the signal processing device is configured to calculate a luminance level based on an average picture level of the input image, calculate an output luminance level based on the luminance level and an offset level corresponding to current information detected in response to the display driving voltage in the timing controller, and output the image signal corresponding to the output luminance level, and wherein, in a case in which the detected current information is equal to or higher than a reference level, the signal processing device is configured to output the image signal corresponding to the calculated luminance level based on the average picture level of the input image, without the offset level.

2. The image display apparatus of claim 1, wherein the signal processing device is configured to, in a case in which the detected current information is lower than a reference level, increase the offset level in response to an increase of a difference between the detected current information and the reference level.

3. The image display apparatus of claim 1, wherein, in a case in which the average picture level of the input image is a first level and the level of the detected current information is a second level lower than a reference level, the signal processing device is configured to output the image signal based on the first level and a first offset level corresponding to the second level, and in a case in which the average picture level of the input image is a third level higher than the first level and the level of the detected current information is the second level lower than the reference level, the signal processing device is configured to output the image signal based on the third level and a second offset level lower than the first offset level.

4. The image display apparatus of claim 1, wherein the signal processing device is configured to decrease the offset level as the level of the display driving voltage increases.

5. The image display apparatus of claim 1, wherein the signal processing device is configured to decrease the offset level as a cumulative operating period of the display increases.

6. The image display apparatus of claim 1, wherein the signal processing device comprises:

an average picture level calculator configured to calculate the average picture level of the input image;

an offset level calculator configured to calculate the offset level based on the detected current information from the timing controller; and a data output part configured to output an image signal corresponding to the output luminance level calculated based on the average picture level and the offset level.

7. The image display apparatus of claim 1, wherein the timing controller is configured to output the display driving voltage or a first current corresponding to the display driving voltage, detect the first current, and transmit detected current information of the first current to the signal processing device.

8. The image display apparatus of claim 7, wherein the signal processing device is configured to, in a case in which the detected current information is lower than a reference level, increase the offset level in response to a increase of a difference between the detected current information and the reference level.

9. The image display apparatus of claim 7, wherein, in a case in which the average picture level of the input image is a first level and the level of the detected current information is a second level lower than the reference level, the signal processing device is configured to output the image signal based on the first level and a first offset level corresponding to the second level.

10. The image display apparatus of claim 9, wherein, in a case in which the average picture level of the input image is the first level and the level of the detected current information is a third level lower than the reference level and higher than the second level, the signal processing device is configured to output the image signal based on the first level and a second offset level corresponding to the third level.

11. An image display apparatus comprising:

an organic light emitting panel;

a signal processing device configured to perform signal processing on an input image and output an image signal;

a timing controller configured to drive the organic light emitting panel based on the image signal from the signal processing device; and a power supply configured to supply a display driving voltage to the timing controller, wherein the signal processing device is configured to calculate a luminance level based on an average picture level of the input image, calculate an output luminance level based on the luminance level and an offset level corresponding to current information detected in response to the display driving voltage in the timing controller, and output the image signal corresponding to the output luminance level, and wherein, in a case in which the average picture level of the input image is a first level and a level of the detected current information is a second level lower than a reference level, the signal processing device is configured to output the image signal based on the first level and a first offset level corresponding to the second level.

12. The image display apparatus of claim 11, wherein, in a case in which the average picture level of the input image is the first level and the level of the detected current information is a third level lower than the reference level and higher than the second level, the signal processing device is configured to output the image signal based on the first level and a second offset level corresponding to the third level.

13. The image display apparatus of claim 12, wherein the signal processing device is configured to control the second offset level to be lower than the first offset level.

14. The image display apparatus of claim 11, wherein, in a case in which the average picture level of the input image is a first level and the level of the detected current information is a fourth level equal to or higher than the reference level, the signal processing device is configured to output the image signal corresponding to the first level.

15. The image display apparatus of claim 11, wherein the signal processing device is configured to decrease the output luminance level of the image signal outputted from the signal processing device as the average picture level increases.

* * * * *